US007103588B2

(12) United States Patent
Beck et al.

(10) Patent No.: US 7,103,588 B2
(45) Date of Patent: Sep. 5, 2006

(54) RANGE-CLUSTERED TABLES IN A DATABASE MANAGEMENT SYSTEM

(75) Inventors: Kevin Leo Beck, Portland, OR (US); Paul Michael Brett, Portland, OR (US); Ronen Grosman, Thornhill (CA); Scott David Lashley, Portland, OR (US); Roger C. Raphael, Sunnyvale, CA (US); Paul Sherwood Taylor, Redwood City, CA (US); Gary Valentin, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 10/429,819

(22) Filed: May 5, 2003

(65) Prior Publication Data

US 2004/0225673 A1 Nov. 11, 2004

(51) Int. Cl.
*G06F 17/30* (2006.01)

(52) U.S. Cl. .......................... 707/2; 707/101; 707/102; 707/4; 707/206

(58) Field of Classification Search ............... 707/1, 707/2, 4, 100, 101, 102, 206
See application file for complete search history.

(56) References Cited

U.S. PATENT DOCUMENTS

| 5,253,361 | A | * | 10/1993 | Thurman et al. ............... 707/3 |
| 5,408,652 | A | * | 4/1995 | Hayashi et al. ................. 707/1 |
| 5,440,732 | A | * | 8/1995 | Lomet et al. ................... 707/1 |
| 5,517,641 | A |   | 5/1996 | Barry et al. |
| 5,594,899 | A |   | 1/1997 | Knudsen et al. |
| 5,664,172 | A | * | 9/1997 | Antoshenkov ................. 707/4 |
| 5,687,361 | A | * | 11/1997 | Sarkar ........................ 707/1 |
| 5,727,196 | A | * | 3/1998 | Strauss et al. ................. 707/2 |
| 5,794,228 | A | * | 8/1998 | French et al. .................. 707/2 |
| 5,918,225 | A |   | 6/1999 | White et al. |
| 5,950,210 | A |   | 9/1999 | Nelson |
| 6,125,370 | A | * | 9/2000 | Courter et al. ............. 707/202 |
| 6,163,775 | A |   | 12/2000 | Wlaschin et al. |
| 6,240,428 | B1 | * | 5/2001 | Yeung et al. ............... 707/206 |
| 6,289,336 | B1 |   | 9/2001 | Melton et al. |
| 6,298,338 | B1 |   | 10/2001 | Melton et al. |
| 6,338,056 | B1 |   | 1/2002 | Dessloch et al. |
| 6,457,000 | B1 |   | 9/2002 | Witkowski et al. |
| 6,526,435 | B1 |   | 2/2003 | Lippert |
| 6,546,394 | B1 | * | 4/2003 | Chong et al. ............... 707/100 |
| 6,859,808 | B1 | * | 2/2005 | Chong et al. ............... 707/101 |
| 6,931,390 | B1 | * | 8/2005 | Zait et al. ..................... 707/2 |

OTHER PUBLICATIONS

Kulkarni, Uday, et al., "Using Semantic Knowledge in Partitioning and Allocation of Data in Distributed Databases," 1991, IEEE.*

(Continued)

*Primary Examiner*—Jeffrey Gaffin
*Assistant Examiner*—Brent S. Stace
(74) *Attorney, Agent, or Firm*—Janet M. Skafar; Ingrid M. Foerster; André Gibbs

(57) ABSTRACT

A method, apparatus and article of manufacture, implementing the method, accesses rows in a range-clustered table in a database management system. A table stores data that is organized into rows and columns. At least one column is designated as a key column. A particular row in the table is accessed based on a relationship between a specified key value and a predetermined range of key values associated with the key column. The table has slots for storing rows, and the slots are organized in accordance with the values of the predetermined range.

17 Claims, 21 Drawing Sheets

OTHER PUBLICATIONS

Chang, et al., "A Dynamic Clustering Technique for Physical Database Design" 1980, ACM.*

Managing Index-Organized Tables, Oracle8i Application Developer's Guide—Fundamentals, Release 8.1.5, A68003-01 [online] Copyright 1999 [Retrieved on Jan. 24, 2006] Retrieved from the Internet: <URL: http://www.csee.umbc.edu/help/oracle8/server.815/a68003/01_07iot.htm> 15 pages.

Oracle9i Index-Organized Tables, Technical Whitepaper [online] Sep. 2001 [Retrieved on Jan. 23, 2006] Retrieved from the Internet:<http://www.oracle.com/technology/products/oracle9i/pdf/iot_twp.pdf> 11 pages.

"TPC Benchmark™ C Full Disclosure Report", Silicon Graphics and Informix Software, Inc. ( © 1997), 72 pps.

* cited by examiner

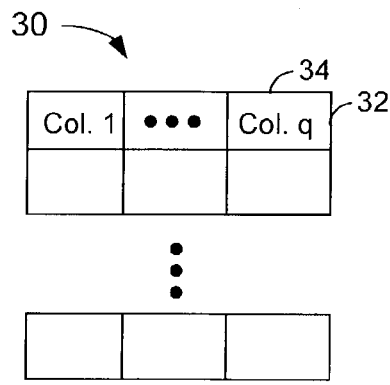
Fig. 1 <u>Prior Art</u>
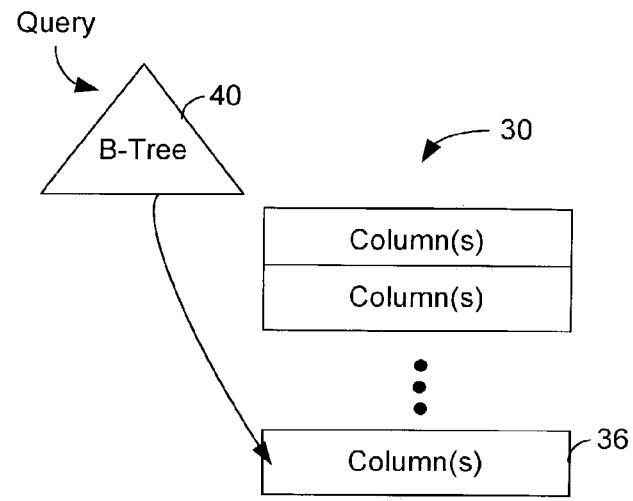
Fig. 2 <u>Prior Art</u>
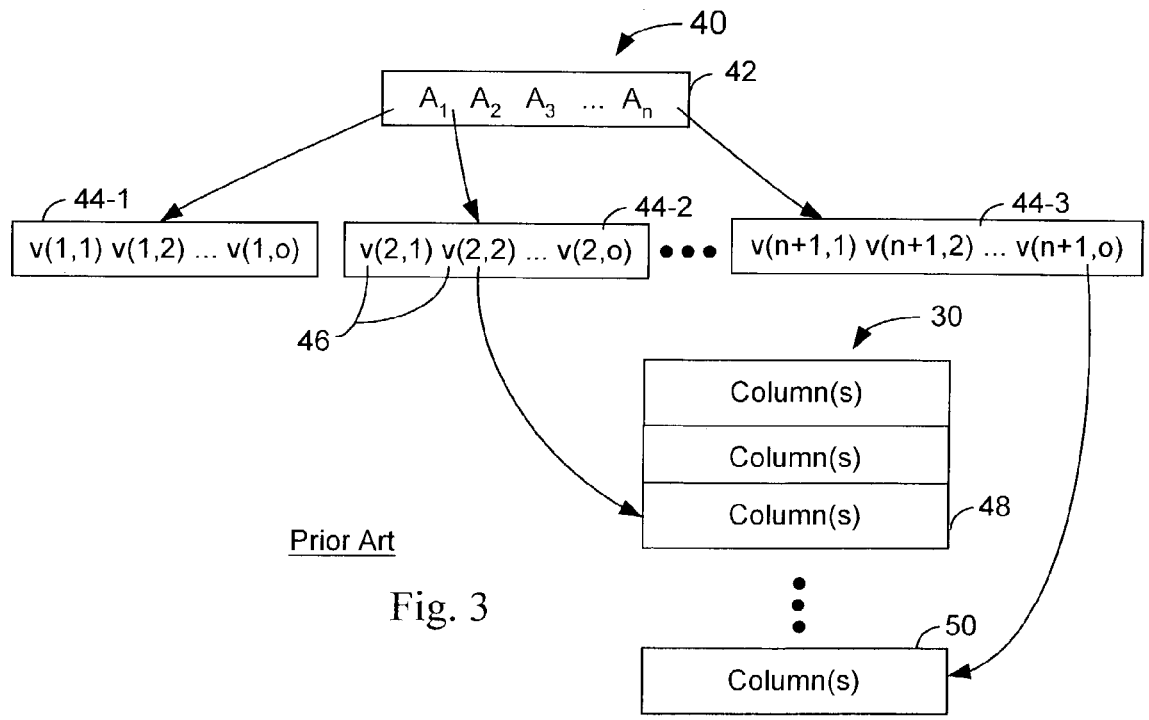
<u>Prior Art</u>
Fig. 3

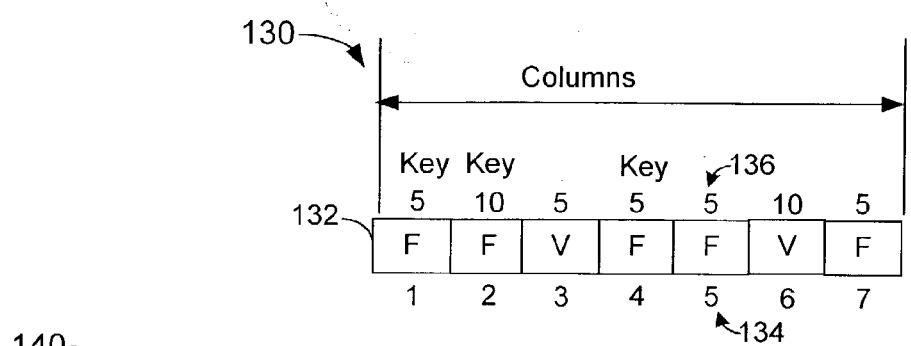
Exemplary Row
Fig. 5
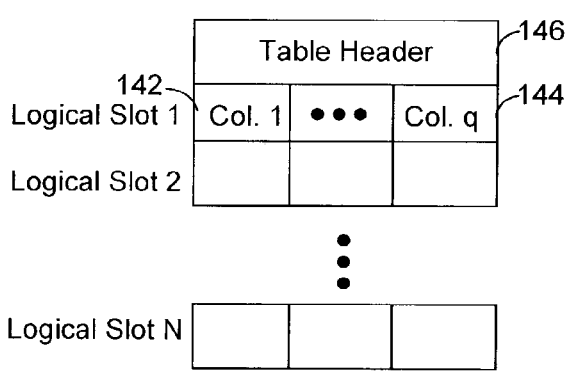
Fig. 6
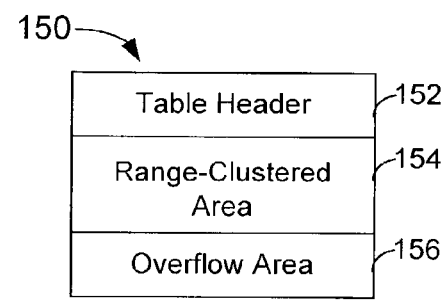
Range-Clustered Table
Fig. 7
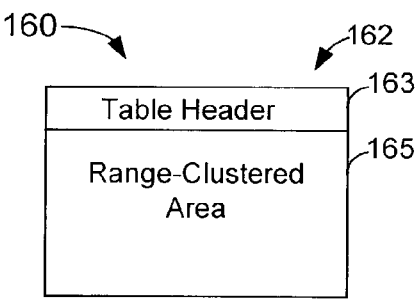
Range-Clustered Table
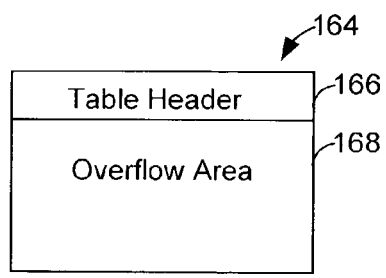
Overflow Table
Fig. 8

192

Determine a logical slot based on specified values for the key columns i as follows:

$$\text{logical slot number} = \left[ \sum_{i=1}^{n} (\text{value}(i) - \text{Min}(i))\,(\text{Mult}(i)) \right] + 1$$

where n is the last key column, and
Mult(1) = 1 where key column i=1

$$\text{Mult}(i) = \prod_{j=1}^{i-1} (\text{Max}(j) - \text{Min}(j) + 1)\quad \text{where column } i>1$$

194

Determine a page number and physical slot number as follows:

page number = (logical slot number/rows per page) +1+ number of header pages
physical slot number=(logical slot number mod rows per page)

196

Access the values of the row based on the page number and physical slot number.

CREATE TABLE EXAMPLE
    ( C_ID        INTEGER        NOT NULL,
    C_NUM      SMALLINT      NOT NULL,
    C_W        INTEGER       NOT NULL,
    C_FIRST    VARCHAR(16)    NOT NULL,
    C_MIDDLE   CHAR(2)        NOT NULL,
    C_LAST     VARCHAR(16)    NOT NULL)

ORGANIZE BY KEY SEQUENCE (
    C_ID     STARTING FROM 1 ENDING AT 2,
    C_NUM  STARTING FROM 1 ENDING AT 3,
    C_W     STARTING FROM 1 ENDING AT 5)

DISALLOW OVERFLOW

| LOGICAL SLOT NUMBER | | KEY SEQUENCE VALUES (C_ID, C_NUM, C_W) |
|---|---|---|
| 1 | | (1,1,1) |
| 2 | | (1,1,2) |
| 3 | | (1,1,3) |
| 4 | | (1,1,4) |
| 5 | | (1,1,5) |
| 6 | | (1,2,1) |
| 7 | | (1,2,2) |
| 8 | | (1,2,3) |
| 9 | | (1,2,4) |
| ⋮ | | |
| 30 | | (2,3,5) |

INSERT INTO EXAMPLE (C_ID, C_NUM, C_W, C_FIRST, C_MIDDLE, C_LAST)
    VALUES (1,2,2,'John','A','Doe')

| 1 | 2 | 2 | John | A | Doe |

UPDATE EXAMPLE
    SET C_FIRST = 'Jane'
    WHERE C_ID = 1, C_NUM=2, C_W=2

| 1 | 2 | 2 | Jane | A | Doe |

DELETE FROM EXAMPLE
    WHERE C_ID = 1, C_NUM=2, C_W=2

| | | | | | |

```
CREATE TABLE CUSTOMER
    ( C_ID         INTEGER        NOT NULL,
      C_NUM        SMALLINT       NOT NULL,
      C_W          INTEGER        NOT NULL,
      C_FIRST      VARCHAR(16)    NOT NULL,
      C_MIDDLE     CHAR(2)        NOT NULL,
      C_LAST       VARCHAR(16)    NOT NULL)

ORGANIZE BY KEY SEQUENCE (
    C_W_ID  STARTING FROM 1 ENDING AT 1,
    C_D_ID  STARTING FROM 1 ENDING AT 10,
    C_ID    STARTING FROM 1 ENDING AT 3000)
```

FIG. 17

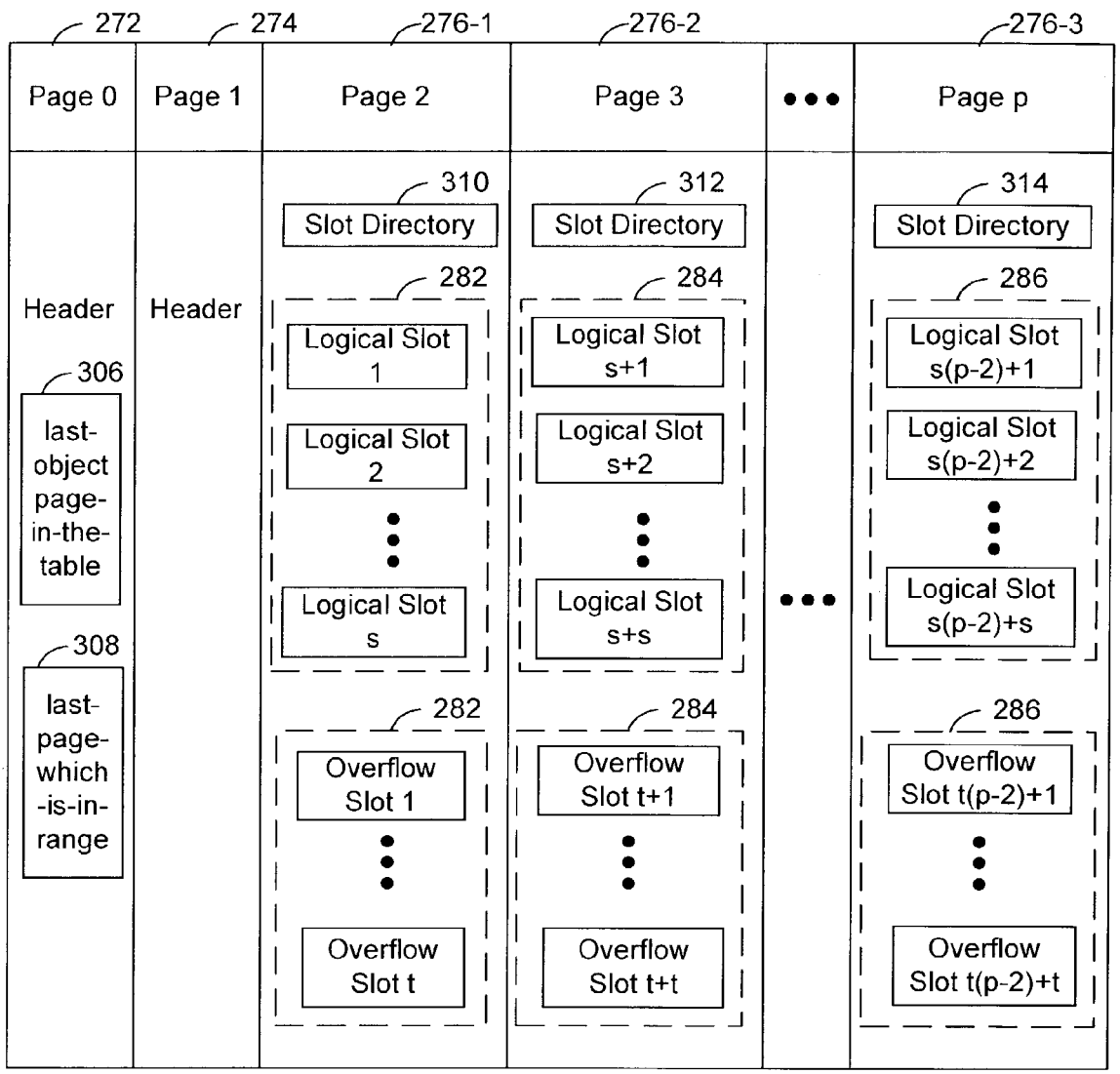
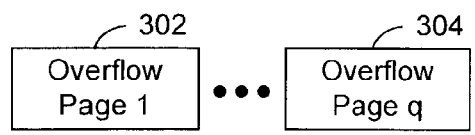
Fig. 18

Duplicates

Example of deleting a record from the overflow area

Scanning a Range Clustered Area

Scanning an Overflow Area

| | | Start key 432 | | | | | Current cursor position 436 | | | Stop key 434 | |
|---|---|---|---|---|---|---|---|---|---|---|---|
| | | | | | | | | | | | |
| Existing Records RSN | 500 | | 502 | | 504 | 505 | 506 | | 508 | | 510 |
| locks | | RR | RR RS | RR | RR RS | RR RS | RR RS CS | | | | |

430 ⟶

Example of locking in an RCT

| Logical page number | Physical page number |
|---|---|
| 0 | 1024 |
| 128 | 4096 |
| 256 | 4224 |
| 384 | 4352 |
| 512 | 4480 |
| ... | ... |

Extent Map Cache

Fig. 27

RANGE-CLUSTERED TABLES IN A DATABASE MANAGEMENT SYSTEM

BACKGROUND OF THE INVENTION

1. Field of the Invention

The invention relates to a technique, specifically a method, apparatus, and article of manufacture that implements the method, to organize and access rows in a range-clustered table in a database management system. This technique is particularly, though not exclusively, suited for use within a database management system.

2. Description of the Related Art

Database management systems allow large volumes of data to be stored and accessed efficiently and conveniently in a computer system. In a database management system, data is stored in database tables which effectively organize the data into rows and columns. A database engine responds to user commands to store and access the data.

In FIG. 1, a database table 30 having rows 32 and columns 34 is shown. A row 32 has one or more columns 34. A row 32 is also referred to as a record.

In the database table 30, the columns 34 are associated with a datatype that defines the type of data stored in that column. The datatype may be selected from a set of predefined datatypes such as numeric, integer, decimal, string, character, date, time and timestamp, among others. In a typical database management system, some datatypes assign a predefined length to a column. Such exemplary datatypes include, and are not limited to, "INTEGER," "DECIMAL," "DATE," "TIME," "TIMESTAMP," and "CHAR(N)" which allocates space for N bytes in a character column. Other datatypes store data having a varying length such as VARCHAR, Binary Large Object (BLOB), and VARGRAPHIC.

To more quickly access the data in a database table, an index is generated based on one or more specified columns of the database table. This set of specified columns is referred to as a key or index key. Each row of the database table is associated with a key. The value of the key is determined by the values stored in the columns making up the key. In the index, the values of the keys are ordered. Each key value is associated with a least one row identifier, or pointer, to its associated row of the database table. Therefore, the keys provide access to all the rows in a database table. The database engine accesses the index to quickly locate a row of data in a database table based on the value of the key. Because the columns of a key are a subset of the columns of the database table, the columns of the key are associated with a datatype, and this datatype information is stored as column description information for that index.

Traditionally, two types of methods are used to access rows—balanced tree (B-tree) indexes and hash indexes. In FIG. 2, a query uses a B-tree 40 to access a particular row 36 in the database table 30. A B-tree 40 is a data structure, stored on disk, that stores indexes. As shown in FIG. 3, the B-tree 40 has a primary data structure 42 that is used to access a secondary data structure 44 storing indexes 46. The indexes 46 of the secondary data structure point to the locations on the disk where the rows are stored. The B-tree 40 allows rows to be read in any order. When searching through a range of key values, the rows can be found efficiently even if those rows are distributed across the disk. The B-tree is typically structured to minimize the number of disk accesses to retrieve a row.

In FIG. 3, the primary data structure 42 has values $A_1 \ldots A_n$. Index values less than $A_1$ are stored in secondary structure 44-1. Index values greater than or equal to $A_1$ are stored in secondary structure 44-2. Values greater than or equal to An are stored in secondary structure 44-3. The index value v(2,2) points to row 48, and the index value v(n+1,o) points to row 50.

The hash index transforms a key into an index value, which is used to store and retrieve a row of data. The hash index performs well when accessing unique keys, such as social security numbers. However, the hash index does not perform range searches efficiently because each row must be read. For example, the hash index cannot efficiently be used to search for all employee names that start with "T".

Although B-tree indexes are efficient at retrieving rows and searching ranges of rows, B-tree indexes require many accesses to the hard disk and performance can be slow. Although hash indexes are efficient at retrieving rows with unique key values, hash indexes cannot perform range searches efficiently because each row must be scanned. Therefore, there is a need for a technique to access a database table that increases the speed of accessing data and allows range searches to be performed efficiently.

SUMMARY OF THE INVENTION

To overcome the limitations in the prior art described above, and to overcome other limitations that will become apparent upon reading and understanding the present specification, the present invention discloses a method, apparatus, and article of manufacture for accessing data in a range-clustered table in a database management system.

In accordance with the present invention, a table stores data that is organized into rows and columns. At least one column is designated as a key column. A particular row in the table is accessed based on a relationship between a specified key value and a predetermined range of key values associated with the key column. The table has slots for storing rows, and the slots are organized in accordance with the values of the predetermined range.

In another aspect of the invention, each slot is associated with a slot number. The particular row is accessed by determining a slot number that represents a location of a particular slot based on the relationship between the specified key value and the predetermined range of key values. In yet another aspect of the invention, an overflow area is provided to store rows having key values outside the predetermined range of a range-clustered area of the table.

In this way, the accessing of the range-clustered table improves the performance of the database management system by increasing the speed of accessing individual rows of data, and by performing range searches efficiently because rows having sequential key values are physically clustered.

BRIEF DESCRIPTION OF THE DRAWINGS

The teachings of the present invention can be readily understood by considering the following detailed description in conjunction with the accompanying drawings, in which:

FIG. 1 depicts an exemplary table in accordance with the prior art;

FIG. 2 depicts an exemplary query using a B-tree to access a table in accordance with the prior art;

FIG. 3 depicts an exemplary B-tree in accordance with the prior art;

FIG. 5 depicts an exemplary row;

FIG. 6 depicts an embodiment of a range-clustered table;

FIG. 7 depicts an alternate embodiment of a range-clustered table with an overflow area;

FIG. 8 depicts an alternate embodiment of a range-clustered table with a separate overflow table;

FIG. 12 depicts a more detailed flowchart of an embodiment of a technique to access a range-clustered table;

FIG. 13 depicts an exemplary SQL statement which creates a range-clustered table in accordance with the flowchart of FIG. 11;

FIG. 14 depicts an exemplary range-clustered table created by the SQL statement of FIG. 13;

FIGS. 16A, 16B, 16C, 16D, 16E and 16F depict exemplary SQL statements and their results; FIGS. 16A and 16B depict an insert statement and the resulting row, respectively; FIGS. 16C and 16D depict an update statement and the resulting row, respectively; and FIGS. 16E and 16F depict a delete statement and the resulting row, respectively;

FIG. 17 depicts an exemplary SQL statement which creates a range-clustered table having an overflow area;

FIG. 18 depicts an exemplary embodiment of the layout of the pages of a range-clustered table;

FIG. 26 depicts a diagram of slots of a range-clustered table to illustrate locking;

FIG. 27 depicts a diagram of an extent map cache which is used when accessing a range-clustered table.

To facilitate understanding, identical reference numerals have been used, where possible, to designate identical elements that are common to some of the figures.

DETAILED DESCRIPTION OF THE PREFERRED EMBODIMENTS

After considering the following description, those skilled in the art will clearly realize that the teachings of the present invention can be utilized to improve performance in substantially any database management system with database tables which have at least one key column storing integer, or integer-like, data which has at least one range of ordered values. The invention is integrated as a component into a database management system. To simplify the following discussion and facilitate reader understanding, the present invention will be described in the context of use in a database management system that executes on a mainframe computer.

A range-clustered table, or portion thereof, physically clusters rows having key values within a specified range of key values. The rows are clustered in key value order. The range-clustered table has a contiguous group of logical slots to store rows, and each logical slot is associated with a key value. The logical slots correspond to physical slots on pages that are stored on disk.

A technique accesses a row of the range-clustered table by determining a logical slot, associated with the key value of the row, that corresponds to the position of the row within the range-clustered table, or range-clustered portion of the table. The technique accesses the row functionally, by executing a set of instructions, rather than using a physical data structure such as a B-tree. This technique can avoid the use of traditional indexing technology such as a B-tree which requires significantly more disk space, input-output operations, logging, and code path. The technique is an improvement over hash indexing because range searches are permitted. Because rows having sequential key values are physically clustered, range queries are very efficient. The technique also allows a secondary index, such as a B-tree, to be used with the range-clustered table.

Figure 4:
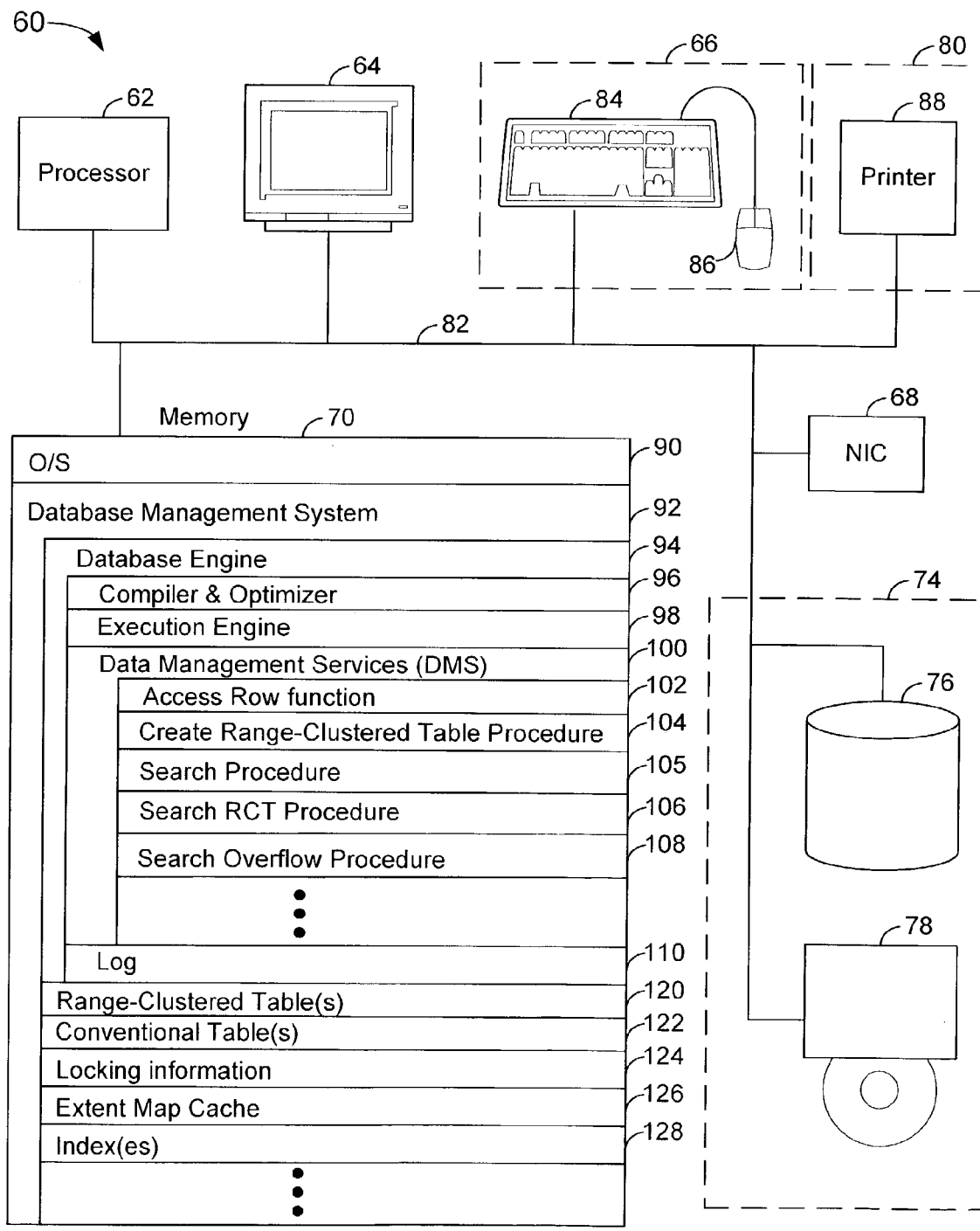
FIG. 4 depicts an illustrative computer system that uses the teachings of the present invention.

FIG. 4 depicts an illustrative computer system 60 that utilizes the teachings of the present invention. The computer system 60 comprises a processor 62, display 64, input interfaces (I/F) 66, communications interface 68, memory 70, disk memories 74 such as hard disk drive 76 and optical disk drive 78, and output interface(s) 80, all conventionally coupled by one or more busses 82. The input interfaces 66 comprise a keyboard 84 and mouse 86. The output interface is a printer 88. The communications interface 68 is a network interface card (NIC) that allows the computer 60 to communicate via a network, such as the Internet.

The memory 70 generally comprises different modalities, illustratively semiconductor memory, such as random access memory (RAM), and disk drives. The memory 70 stores operating system (O/S) 90 and application programs such as the database management system 92. The O/S 90 may be implemented by any conventional operating system, such as z/OS® (Registered Trademark of International Business Machines Corporation), AIX® (Registered Trademark of International Business Machines Corporation), UNIX® (Registered Trademark of Unix System Laboratories), and Windows NT® (Registered Trademark of Microsoft Corporation).

The database management system 92 is a DB2® system (DB2® is a registered trademark of International Business Machines Corporation). However, the inventive technique is not meant to be limited to a DB2® database management system, and may be used with other database management systems.

The specific software modules that implement the present invention are incorporated in the database management system 92. The software modules are comprised of instructions which, when loaded into the memory 70, are executed by the processor 62.

A database engine 94 allows a user to execute commands to insert data into, delete data from, or search the database tables. In one embodiment, the commands are Structured Query Language (SQL) statements that conform to a Structured Query Language standard as published by the American National Standards Institute (ANSI) or the International Standards Organization (ISO). In alternate embodiments, languages other than SQL may be used.

Generally, the database management system software is tangibly embodied in a computer-readable medium, for example, memory 70 or, more specifically, one of the disk drives 74, and is comprised of instructions which, when executed, by the computer system 60, causes the computer system 60 to utilize the present invention.

In the memory 70, the database management system 92 is comprised of software modules and data. A software module may comprise one or more computer programs. In one embodiment, the memory 70 may store a portion of the software modules and data making up the database management system 92 in semiconductor memory, while other software modules and data are stored in disk memory. In some embodiments, the database management system 92 is comprised of the following:

A Compiler & Optimizer 96 that receives a SQL statement, compiles the statement and determines an appropriate execution plan to perform the SQL statement;

An Execution Engine 98 that executes an execution plan;

Data Management Services (DMS) 100 that comprise low-level functions to physically access the rows of a table in the database;

An Access Row Function 102, that is part of the DMS 100, that accesses a row in the range-clustered table (RCT);

A Search procedure 105, that is part of the DMS 100, that searches both the range-clustered and overflow areas of a range-clustered table;

A Search RCT procedure 106, that is part of the DMS 100, that searches the range-clustered area of a range-clustered table;

A Search Overflow procedure 108, that is part of the DMS 100, that searches an overflow area of a range-clustered table;

A log 110 that stores a history of activity in the database management system;

Range Clustered Table(s) 120 that have a range-clustered area to physically cluster rows having key values within a predetermined range of values;

Conventional Table(s) 122 that may include separate overflow tables;

Locking information 124 that stores locks on the range-clustered table in accordance with an isolation level;

An Extent Map Cache 126 that stores a mapping of logical to physical page numbers in memory; and Secondary Index(es) 128, such as B-tree indexes, that may be used with the range-clustered table.

The present invention may be implemented as a method, apparatus, or article of manufacture using standard programming and/or engineering techniques to produce software, firmware, hardware, or any combination thereof. The term "article of manufacture" (or alternately, "computer program product") as used herein is intended to encompass a computer program accessible from any computer-readable device, carrier, or media. Those skilled in the art will recognize many modifications may be made to this configuration without departing from the scope of the present invention.

Those skilled in the art will recognize that the exemplary computer illustrated in FIG. 4 is not intended to limit the present invention. Indeed, those skilled in the art will recognize that other alternative hardware environments may be used without departing from the scope of the present invention.

FIG. 5 depicts an exemplary row 130 of a table. The row 130 has seven columns 132. Each block represents a column 132, and a column number 134 is shown below each block. Some columns have a fixed length, designated by an "F", and other columns have a variable length, designated by a "V". The numbers above each block 136 represent the maximum length of that column. For example, column one has a length of five bytes. Three columns are designated as key columns—columns one, two and four. In a range-clustered table, the key comprises columns having non-null, integer values. In an alternate embodiment, the key may also comprise columns having integer-like values, such as a date or time. In another embodiment, NULL values are allowed in the key and a NULL value is represented by a designated integer value. In an alternate embodiment, non integer-like values, such as, for example, a fixed length character datatype, are allowed in the key.

FIG. 6 depicts an embodiment of a range-clustered table 140 that has N logical slots 142. Each logical slot stores a row 144. The logical slots of the table correspond to key values in accordance with the range(s) associated with the key column(s). The rows are stored in the logical slots in key-ordered sequence. A table header 146 precedes the range-clustered area. The table header 146 stores information describing the range-clustered table.

FIG. 7 depicts an alternate embodiment 150 of a range-clustered table that has a table header 152 that contains information describing a range-clustered area 154 and an overflow area 156. The range-clustered area stores rows as described above with respect to FIG. 6. The overflow area 156 stores rows that have key values outside the specified range(s) of the range-clustered area. In an alternate embodiment, the overflow area 156 also stores rows having duplicate key values of rows already stored in the range-clustered area.

FIG. 8 depicts another alternate embodiment 160 of a range-clustered table 162 that has an associated overflow table 164. The range-clustered table 162 stores rows having key values within the specified range(s), as described above. The range-clustered table 162 also has a table header 163 that contains information describing a range-clustered area 165. The overflow table 164 stores rows having key values outside the range(s) of the range-clustered table 162. In an alternate embodiment, the overflow table 164 also stores rows having duplicate key values, even if those key values are within the ranges(s) of the range-clustered table 162. The overflow table 164 also has a table header 166 that contains information describing an overflow area 168. The range-clustered table 162 and overflow table 164 can appear unified using the Union operator of SQL. In another embodiment, the range-clustered table 162 and overflow table 164 can be unified using internal algorithms, some of which are described below.

Figure 9:
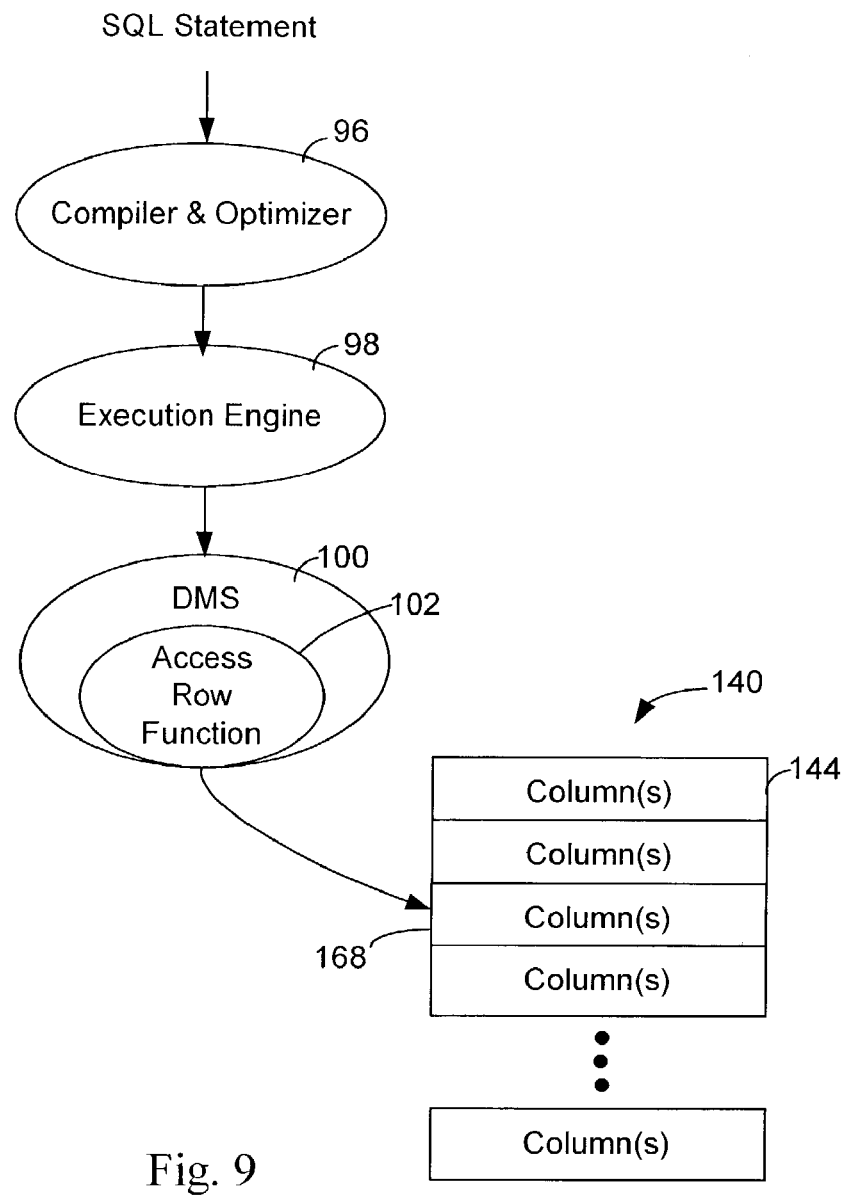
FIG. 9 depicts the processing of a SQL statement through a database engine.

FIG. 9 depicts the processing of a SQL statement through the database engine. The compiler and optimizer 96 receives and parses a SQL statement. Within the compiler, the optimizer generates alternative execution plans, determines a cost for each plan, and selects an appropriate execution plan. To determine a cost for accessing the range-clustered table, the range-clustered table is modeled using a virtual index in which the range-clustered table is represented as a large B-tree having one level. In other words, the range-clustered table is modeled as a conventional table having a large one-level index. Therefore, the cost for accessing the range-clustered table is relatively low. In practice, this virtual index works well because of the speed of accessing the rows of the range-clustered table and the clustering of rows having sequential key values. Alternatively, a specific cost for the range-clustered table can be constructed using well-known methods for determining cost.

The execution engine 98 executes the execution plan selected by the optimizer. The execution engine 98 invokes the data management services (DMS) 100 which invoke the access row function 102 to access the desired row(s) 144 of the database table 140. In one embodiment, the access row function is part of the DMS.

Figure 10:
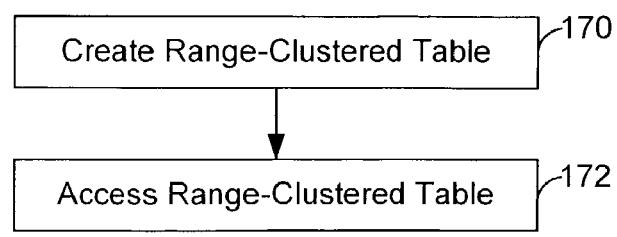
FIG. 10 depicts a high-level flowchart of a process to create and access a range-clustered table.

FIG. 10 depicts a high-level flowchart of a process to create and access a range-clustered table. In step 170, a range-clustered table is created using the create range-clustered table procedure 104 of FIG. 4. In step 172, the range-clustered table is accessed using the access row function of FIGS. 4 and 9.

Figure 11:
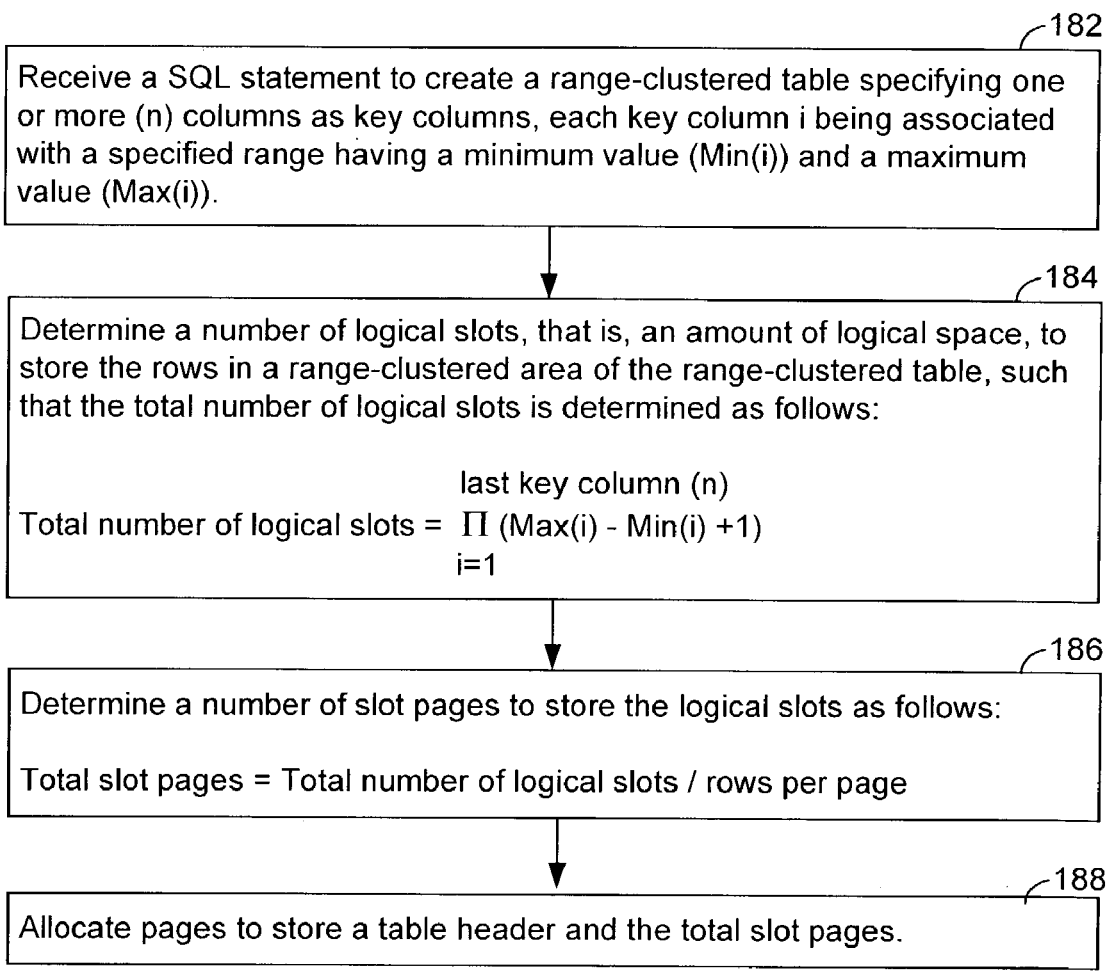
FIG. 11 depicts a more detailed flowchart of an embodiment of a technique to create a range-clustered table.

FIG. 11 depicts a more detailed flowchart of a process of creating a range-clustered table that is implemented by the create range-clustered table procedure 104 of FIG. 4. In step 182, a SQL statement to create a range-clustered table is received. The SQL statement specifies one or more, up to n, columns as key columns. Each key column i is associated with a specified range having a minimum value (Min(i)) and a maximum value (Max(i)).

In step 184, a number of logical slots, that is, an amount of logical space, to store the rows of the range-clustered table is determined. Each key column i has a range defined by a maximum value (Max(i)) and a minimum value (Min(i)). The total number of logical slots is determined as follows:

$$\text{Total number of logical slots} = \prod_{i=1}^{n} (\text{Max}(i) - \text{Min}(i) + 1)$$

The slots have a predetermined length based on the number, length and type of columns making up a row. If any columns have a variable length, the length of the slot is determined based on the maximum length of the columns of the row.

In step 186, a number of slot-pages to store the logical slots is determined as follows:

Total slot-pages=Total number of logical slots/rows per page.

The number of rows per page is a predefined value which is set by a user or, alternatively, computed by the database management system automatically.

In step 188, pages are allocated to store a table header and the slot-pages. In yet another embodiment, a unique costing-index is created in the catalog tables, but not on disk. The costing-index is the virtual index, described above, used by the optimizer to determine a cost for executing a SQL statement using the access row function and the range-clustered table.

FIG. 12 depicts a more detailed flowchart of an embodiment of a technique to access a range-clustered table that is implemented by the access row function 102 of FIG. 4. In step 192, a logical slot is determined based on specified key values for each key column i as follows:

$$\text{logical slot number} = \left[\sum_{i=1}^{n} (\text{value}(i) - \text{Min}(i))(Mult(i))\right] + 1$$

where n is the last key column, and Mult(1)=1 for key column 1.

$$Mult(i) = \prod_{j=1}^{i-1} (\text{Max}(i) - \text{Min}(i) + 1), \text{ where column } i > 1.$$

In step 194, a page number and physical slot number are determined based on the logical slot number. The page number that stores a particular logical slot is determined as follows:

page number=(logical slot number/rows per page)+1+number of header pages.

The page number described above is relative to the table, and is a logical page number.

The physical slot number on the page that stores the particular slot is determined as follows:

physical slot number=(logical slot number MOD rows per page).

In step 196, the values stored in the row are accessed based on the page number and physical slot number. In an alternate embodiment, a page number representing the physical location of that page on a disk, i.e., a physical page number, is determined from an extent map, or alternately, an extent map cache, based on the logical page number and will be described in further detail below with reference to FIG. 27.

In an alternate embodiment, the first logical slot is slot zero, rather than slot one. In this embodiment, the logical slot number is determined as follows:

$$\text{logical slot number} = \left[\sum_{i=1}^{n} (\text{value}(i) - \text{Min}(i) + 1)(Mult(i))\right].$$

The embodiments described above determine the logical slot number with respect to the first slot at the beginning of the range-clustered area. In an alternate embodiment, the logical slot number can be determined with respect to the last slot in the range-clustered area of the table.

FIG. 13 depicts an exemplary SQL statement 200 to create a range-clustered table in accordance with FIG. 11 without an overflow area. The create statement 200 creates a table having six columns. The portion of the statement reciting, "ORGANIZE BY KEY SEQUENCE ( )," indicates that the table to be created is a range-clustered table, and specifies the ranges associated with each key column. The portion of the statement reciting, "DISALLOW OVERFLOW," prevents the creation of an overflow area. In an alternate embodiment, a range-clustered table without an overflow area is created by default, that is, without reciting "DISALLOW OVERFLOW" in the SQL statement.

The create statement of FIG. 13 designates columns C_W, C_NUM, and C_ID as key columns one, two and three, respectively. For key column one, C_W, the minimum value of the range (Min(1)) is equal to one, and the maximum value of the range (Max(1)) is equal to five. For key column two, C_NUM, the minimum value of the range (Min(2)) is equal to one, and the maximum value of the range (Max(2)) is equal to three. For key column three, C_ID, the minimum value of the range (Min(3)) is equal to one, and the maximum value of the range (Max(3)) is equal to two. This exemplary create statement does not create an overflow area for the range-clustered table.

The total number of logical slots allocated for the range-clustered table is determined as follows:

total number of logical slots=(Max(1)−Min(1)+1)* (Max(2)−Min(2)+1)*(Max(3)−Min(3)+1) (5−1+ 1)*(3−1+1)*(2−1+1)=30

FIG. 14 depicts an exemplary range-clustered table 210 created by the SQL command 200 of FIG. 13. The table 210 has thirty logical slots which are numbered consecutively from one to thirty. The logical slot number associated with a slot is shown on the left. The tuples of key sequence values (C_ID, C_NUM, C_W) that are associated with the slots are shown on the right. For example, the tuple (1,2,1) is associated with logical slot six.

For example, to access a row of the range-clustered table of FIG. 14, Mult(1) is equal to one, Mult(2) is equal to five and Mult(3) is equal to fifteen. Therefore, for the table of FIG. 14, a logical slot number for a particular key is determined as follows:

logical slot number=[((value(1)−1)*(1))+((value(2)− 1)*(5))+((value(3)−1)*(15))]+1.

The logical slot number associated with the key having values of C_W=2, C_NUM=2, and C_ID=1, value(1), value (2) and value(3), respectively, is equal to seven. In another example, the logical slot number associated with the key having values of C_W=5, C_NUM=3, and C_ID=2, value (1), value(2) and value(3), respectively, is equal to thirty.

Figure 15A:
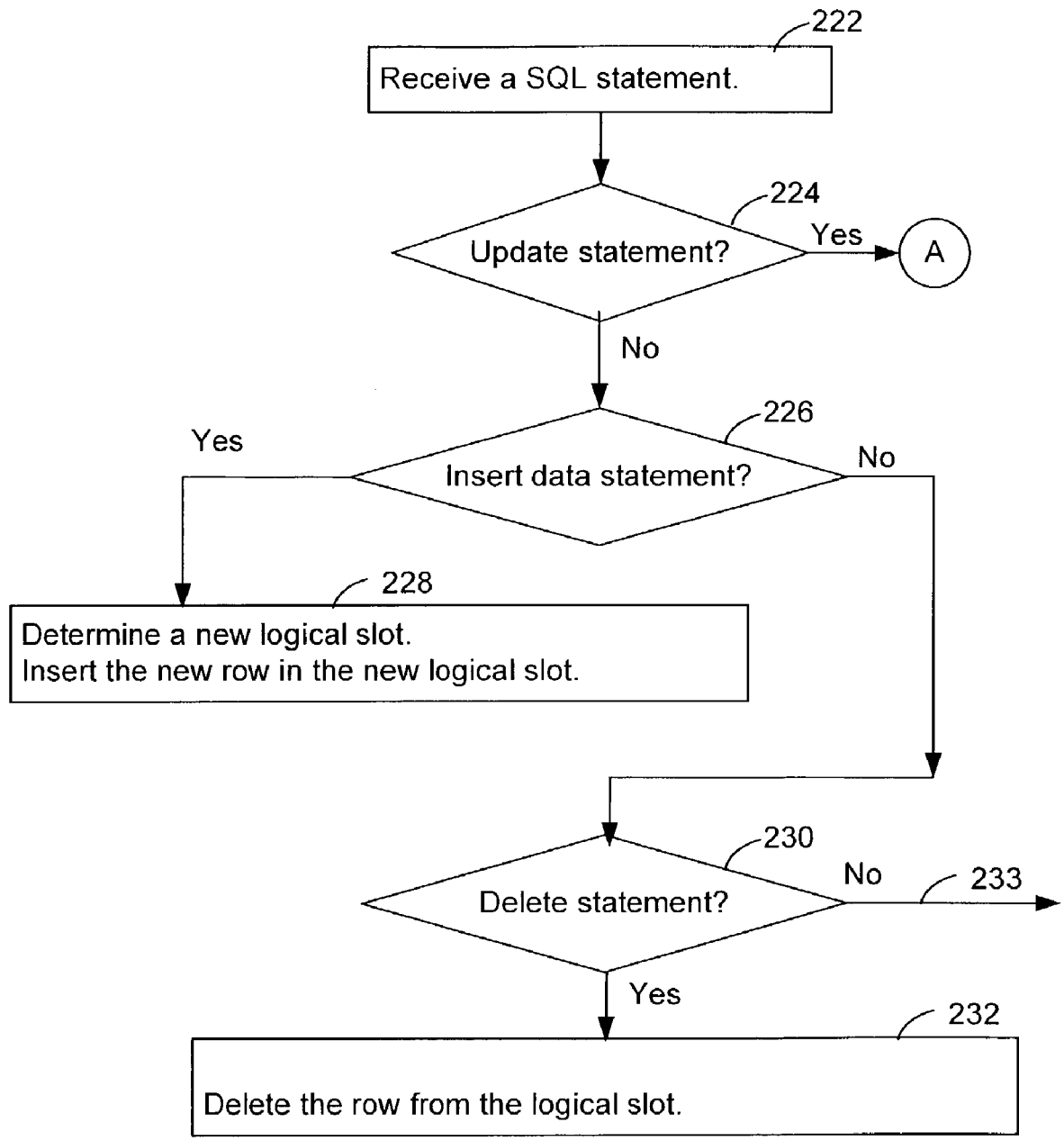
FIGS. 15A and 15B collectively depict a high-level flowchart of a process of updating, inserting and deleting a row from a range-clustered table using the technique of FIG. 12.
Figure 15B:
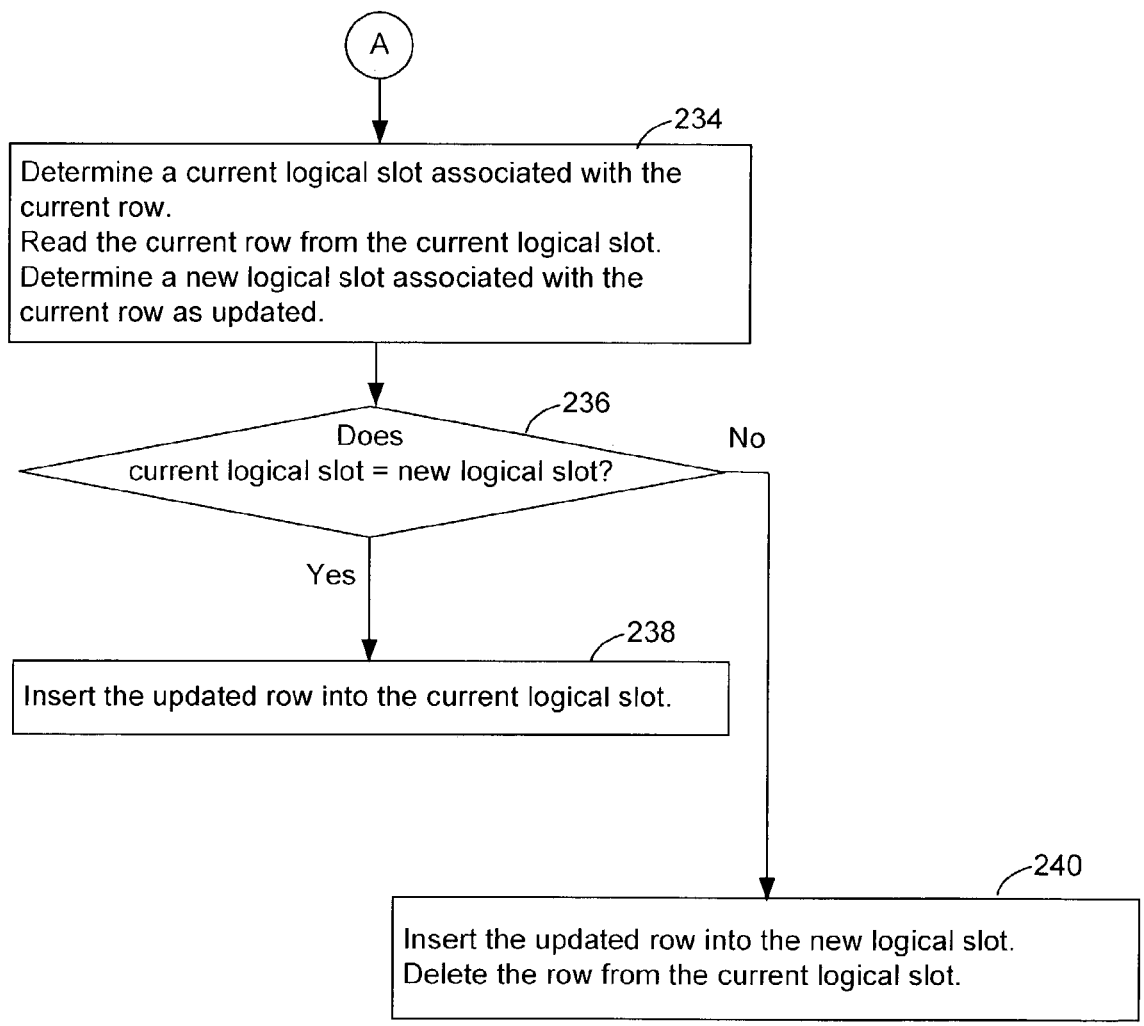

FIGS. 15A and 15B collectively depict a high-level flow-chart of a process of updating, inserting and deleting a row from a range-clustered table using the technique of FIG. 12. In step 222, a SQL statement is received. Step 224 determines whether the SQL statement is an update statement.

If not, step 226 determines whether the SQL statement is an insert statement. If so, in step 228, a new logical slot is determined using the technique of FIG. 12, and the new row is inserted into the new logical slot.

If step 226 determines that an insert statement was not received, step 230 determines whether the SQL statement is a delete statement. If so, in step 232, a current logical slot of the row to be deleted is determined, and the row is deleted from that logical slot. If not, the process continues to identify the type of SQL statement received as shown by arrow 233.

If step 224 determines that the SQL statement is an update statement, the process continues to step 234 of FIG. 15B. In step 234, a current logical slot associated with the row to be updated is determined. The current row is retrieved from the current logical slot. The row in the current logical slot is accessed using the technique of FIG. 12. A new logical slot, associated with the current row, as updated, is determined.

Step 236 determines whether the current logical slot is equal to the new logical slot. If so, in step 238, the updated row is inserted into the current logical slot. If not, in step 240, the updated row is inserted into the new logical slot, and the row is deleted from the current logical slot using the technique of FIG. 12.

FIGS. 16A–16F depict exemplary SQL statements and their results. As shown in FIGS. 16A and 16B, a SQL statement 252 inserts a row 253 into logical slot seven of the range-clustered table of FIG. 14. As shown in FIGS. 16C and 16D, another SQL statement 254 updates a value of the row 255 at logical slot seven of the range-clustered table. As shown in FIGS. 16E and 16F; yet another SQL statement 256 deletes the contents of the row 257 at logical slot seven of the range-clustered table.

FIG. 17 depicts an exemplary SQL statement 260 to create a range-clustered table having an overflow area. The SQL statement 260 creates an overflow area to store rows having key values outside the specified range(s) of the range-clustered table. Alternately, the overflow area may also store rows having duplicate keys that have values within the specified range(s) of the range-clustered table. In an alternate embodiment, the SQL statement recites "ALLOW OVERFLOW," to create an overflow area.

FIG. 18 depicts an exemplary page layout 270 of a range-clustered table. Pages zero and one, 272 and 274, respectively, store table header information. However, the invention is not meant to be limited to two header pages. Alternately, any number of header pages, such as 3, 4, . . . h, may be used. In one embodiment, the page numbers of FIG. 18 are logical page numbers.

In one embodiment, pages two through p, 276–280, each have a range-clustered area, 282–286, respectively, to store a number s of logical slots. The number of pages that store logical slots was determined in accordance with FIG. 11. In another embodiment, each page 276–280 that has a range-clustered area 282–286 also has an overflow area 292–296 that stores a predetermined number (t) of overflow slots.

In yet another embodiment, at least one additional page, 302 and 304, provides an overflow area. In another alternate embodiment, the range-clustered table has overflow areas on the same pages as the range-clustered areas, and also has at least one separate overflow page.

In an alternate embodiment, on page zero, in the table header, a last-object-page-in-the-table value 306 and a last-page-which-is-in-range value 308 are stored. These values are used to determine whether an overflow page has any rows, and will be further described below. In another embodiment, each page 276–280 that stores logical slots also has a slot directory 310–314, respectively, to reflect the rows as deleted.

Figure 19:
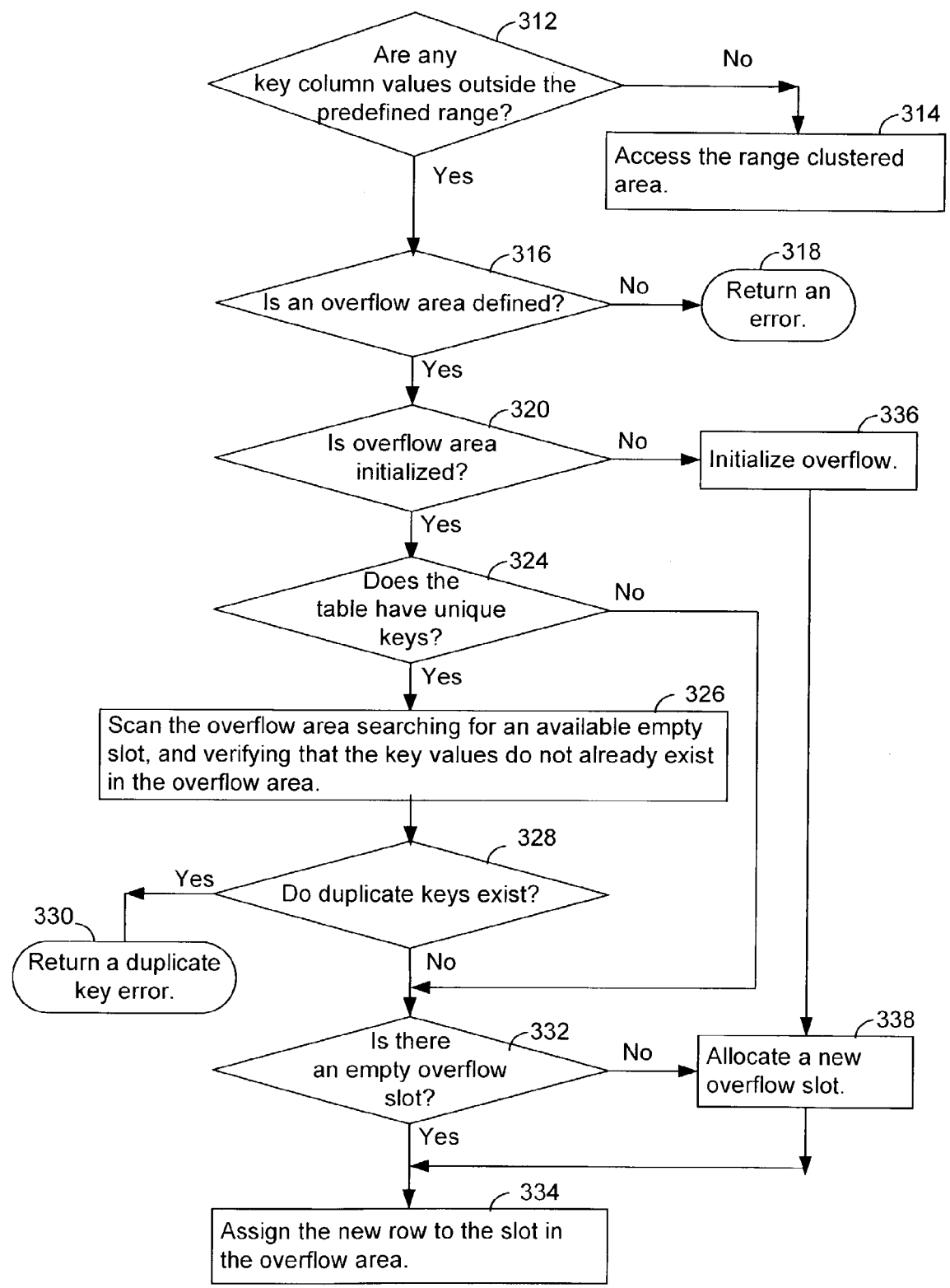
FIG. 19 depicts a high-level flowchart of a process of inserting a row in an overflow area of a range-clustered table.

FIG. 19 depicts a high-level flowchart of a process of inserting a row in an overflow area of a range-clustered table. The overflow area stores rows having at least one key column value outside the specified range(s) of the range-clustered area of the table. In an alternate embodiment, the rows of the overflow area may be accessed using well-known methods including, but not limited to, hash indexing and B-tree indexing.

The steps of FIG. 19 may be performed after a SQL insert statement is identified, for example, after step 226 of FIG. 15A. Step 312 determines whether any key column values are outside the predefined range(s) of the range-clustered area. If not, in step 314, the range-clustered area is accessed as described above. If any key column values are outside the specified ranges of the range-clustered area, step 316 determines whether an overflow area is defined, that is whether an overflow area exists. If not, step 318 returns an error.

If step 320 determines that an overflow area is defined, step 324 determines whether the overflow area has been initialized. If so, step 324 determines whether the table has unique keys. If so, step 326 scans the overflow area searching for an available empty slot and verifying that the key values do not already exist in the overflow area.

Step 328 determines whether any duplicate keys exist. If so, in step 330, a duplicate key error is returned. In one embodiment, steps 326, 328 and 330 are combined such that the scan ends if a duplicate key is found, and a duplicate key error is returned.

If step 328 determines that no duplicate keys exist, then step 332 determines whether there is an empty slot in the overflow area. If so, in step 334, a new row is assigned, that is, inserted, into the slot in the overflow area.

If step 320 determined that the overflow area had not been initialized, step 336 initializes the overflow area. The value of variables, referred to as startOverflowRSN and endOverflowRSN, which define the first and last logical slots in the overflow area, respectively, are initialized. In one embodiment, the value of startOverflowRSN is derived from the value of the last-page-which-is-in-range which is stored in the table header. For example, the value of startOverflowRSN is equal to the value of the last-page-which-is-in-range multiplied by the number of rows per page; the result of this multiplication is then incremented by one to have startOverflowRSN point to the slot following the range-clustered area. Initially, the value of endOverflowRSN is set to the same value as startOverflowRSN. In another embodiment, if the overflow page is full, another overflow page is allocated and the value of the last-object-page-in-the-table 306 (FIG. 18) is updated.

In step 338, an overflow slot is allocated, the value of endOverflowRSN is incremented by one, and the process continues to step 334.

If step 324 determined that the table does not have unique keys, the process continues to step 332.

If step 332 determines that there are no empty slots, then the process continues to step 338 which allocates an overflow slot.

Figure 20:
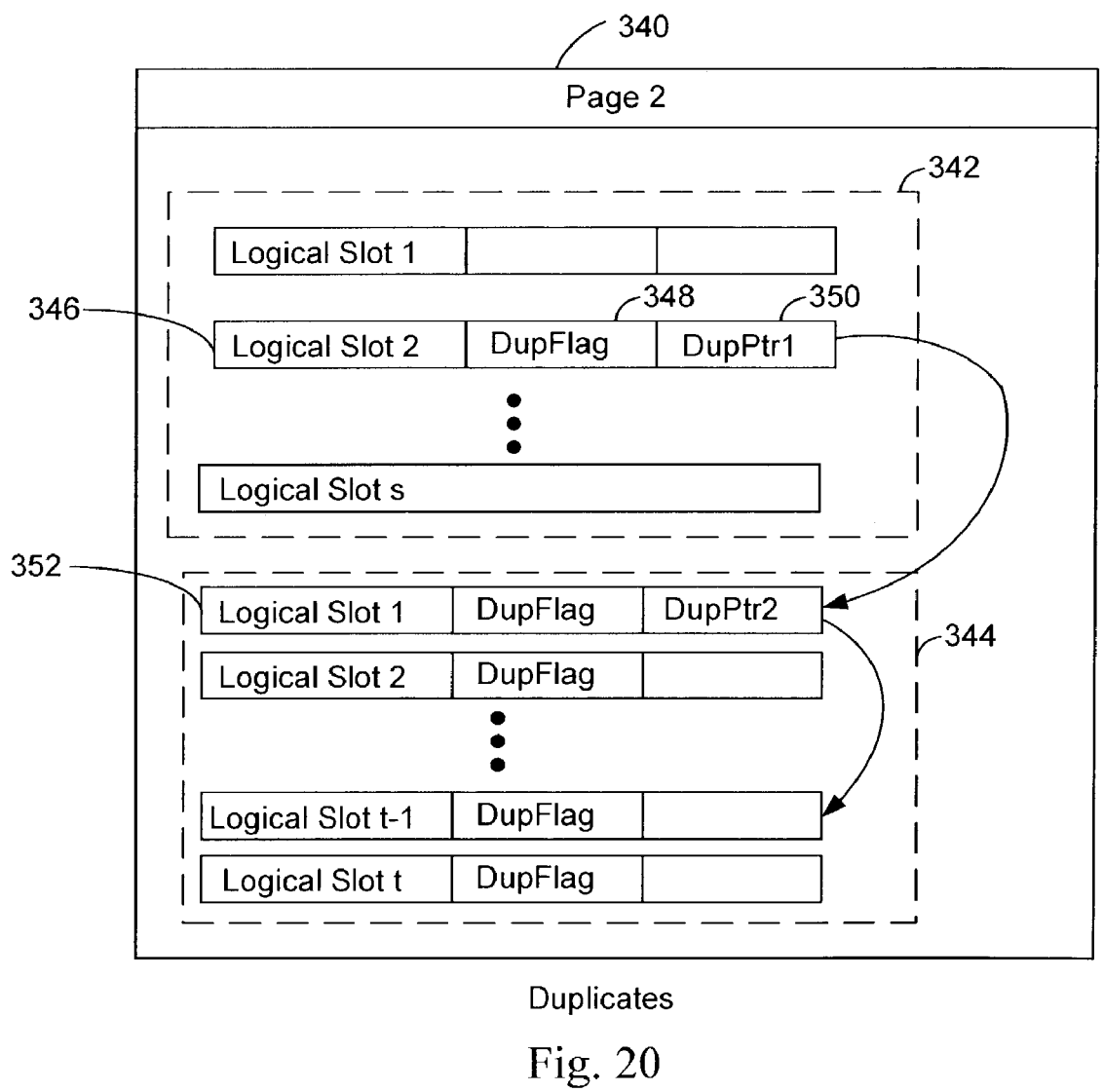
FIG. 20 depicts a block diagram of a range-clustered table having duplicate key values.

FIG. 20 depicts a block diagram of a page 340 of a range-clustered table having duplicate key values in accordance with another embodiment of the invention. Duplicate key values are permitted and are stored in such a way as to maintain good overall clustering. The range-clustered area 342 is mapped to a set of pages. To accommodate duplicate values, each page is configured to contain some extra slots. The extra slots can be chained together in a set of configurable or static hash chains, to minimize conflicts between independent duplicate values.

Rows having duplicate key values are stored in an overflow area 344 on the same page as the "home" logical slot 346 in the range-clustered area. Each slot is associated with a Duplicate Flag (DupFlag) 348 and a duplicate pointer 350. If a slot has a duplicate value, the duplicate flag is set to "True" to indicate that a duplicate value is stored, and the duplicate pointer, for example, DupPtr1, points to the logical slot 352 storing the row with the duplicate key value. The duplicate pointer chains the rows having the same key value. In FIG. 20, two duplicate rows are stored in the overflow area.

Figure 21:
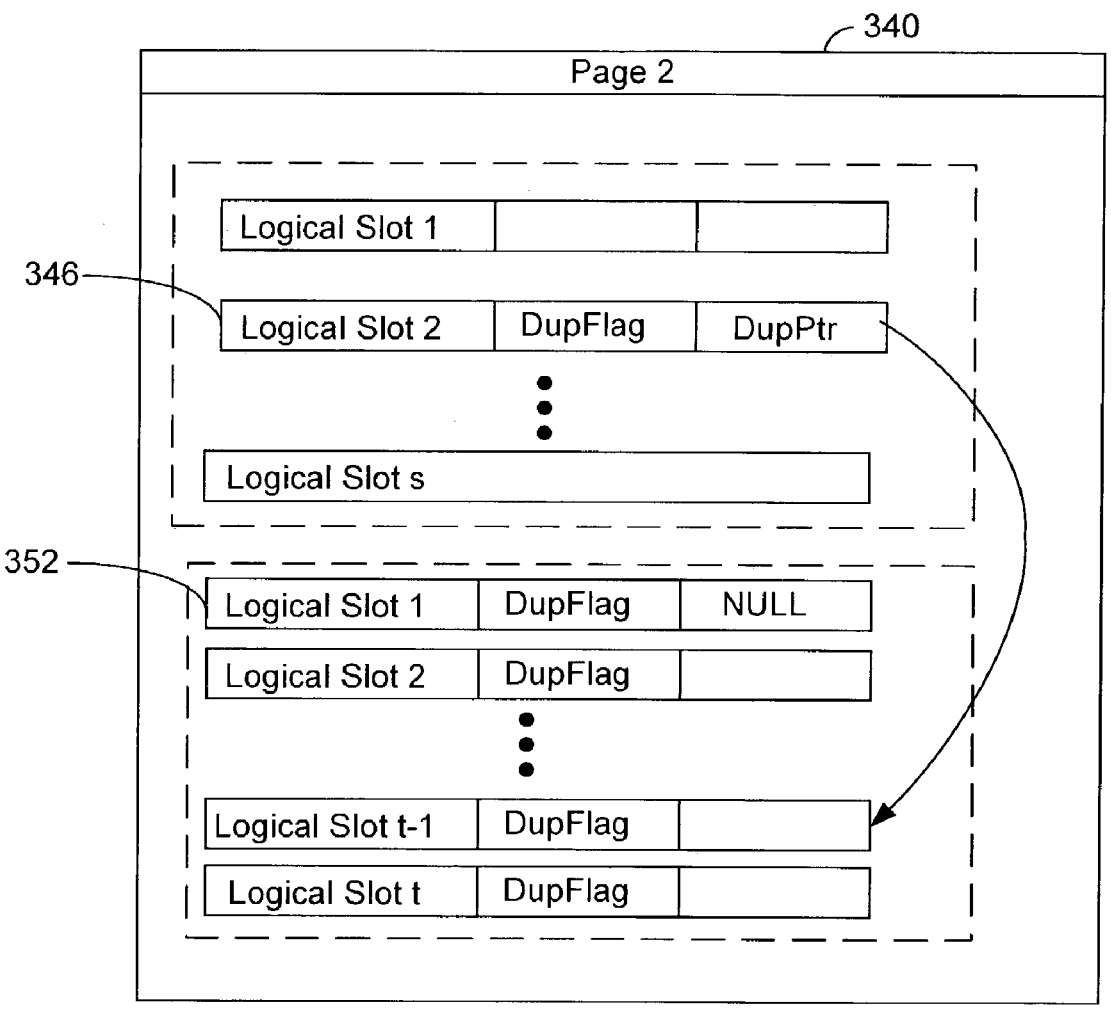
FIG. 21 depicts a block diagram illustrating the deletion of a duplicate row from an overflow area of a range-clustered table.

FIG. 21 depicts a block diagram of deleting a duplicate row from an overflow area 344 of the range-clustered table 340 of FIG. 20. As duplicates are removed from the chain, links, that is, pointers, are updated but rows are not moved. When a row having a duplicate key 352 is deleted from the overflow area, the duplicate pointer in the previous row 346 is set equal to the value of the duplicate pointer of the row being deleted (DupPtr2). The duplicate pointer of the row being deleted 352 is set equal to NULL.

Figure 22:
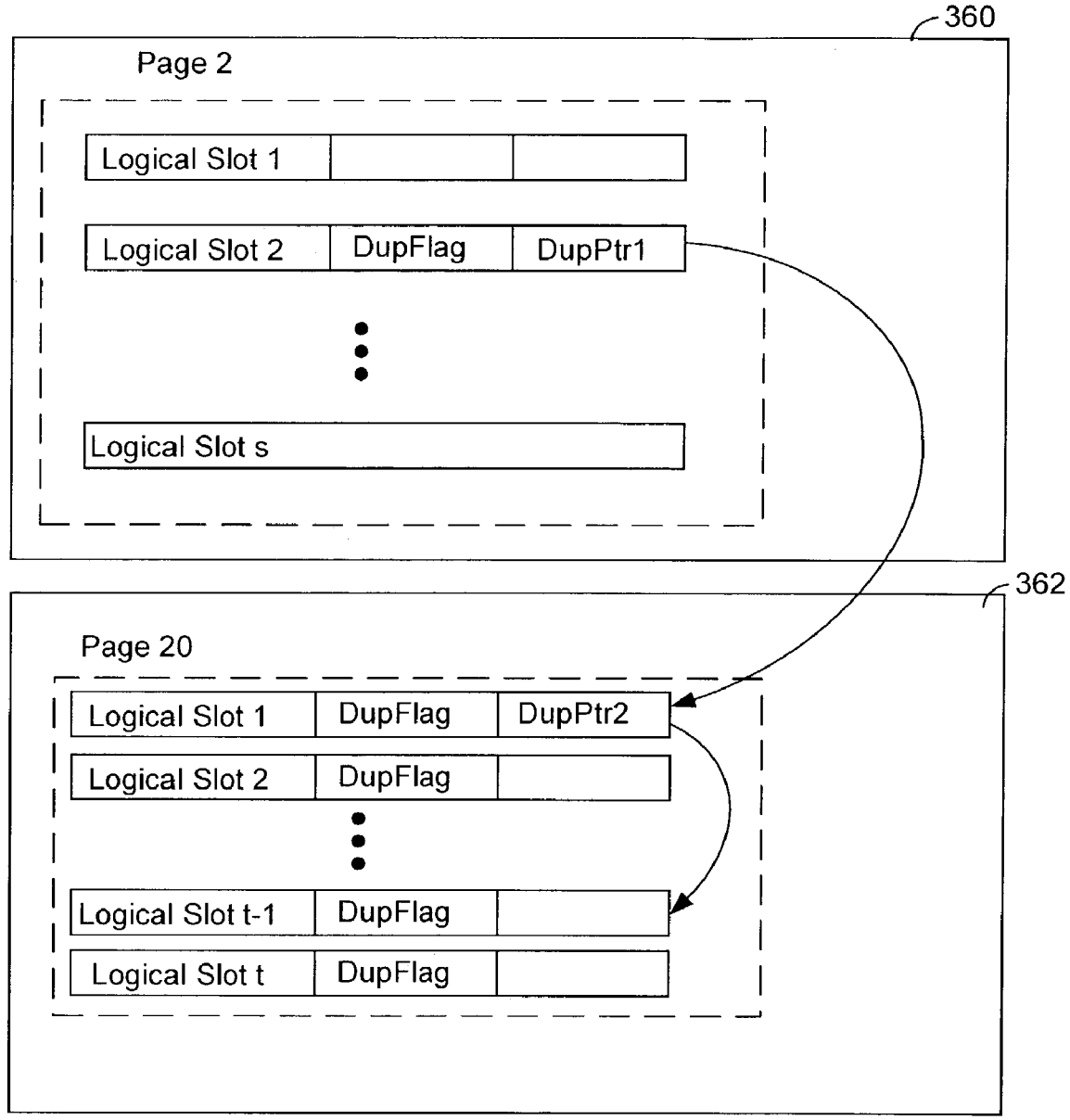
FIG. 22 depicts a block diagram illustrating the storage of duplicate rows in an overflow area that is located on a different page in the range-clustered table.

FIG. 22 depicts a block diagram of storing duplicate rows on a different page from the page storing range-clustered area 360. The rows having duplicate key values are stored in the overflow page 362.

In another embodiment, when a row insertion occurs, the "home slot" for the row in the range-clustered area, which is a logical slot, is first checked. If a row already exists at that slot, the new row is stored in the overflow space on the page. If there is no more space on the page, then space is allocated from another overflow page and the new row is inserted into that space, and that overflow space is linked into the hash chain. The original slot that the key mapped to is flagged to note that an overflow area exists for the key and a forward pointer is stored to point to the next row in the chain. As duplicates are added to the list, the duplicates are chained together. This technique allows secondary B-tree indexes to point directly to the rows which can eliminate chain scans when searching for rows based on secondary key indexes and can eliminate B-tree updates when the chain is updated with duplicates. In another embodiment, locking is performed on the logical slot associated with the key, the "home slot," to avoid deadlocking when managing duplicates lists.

Figure 23:
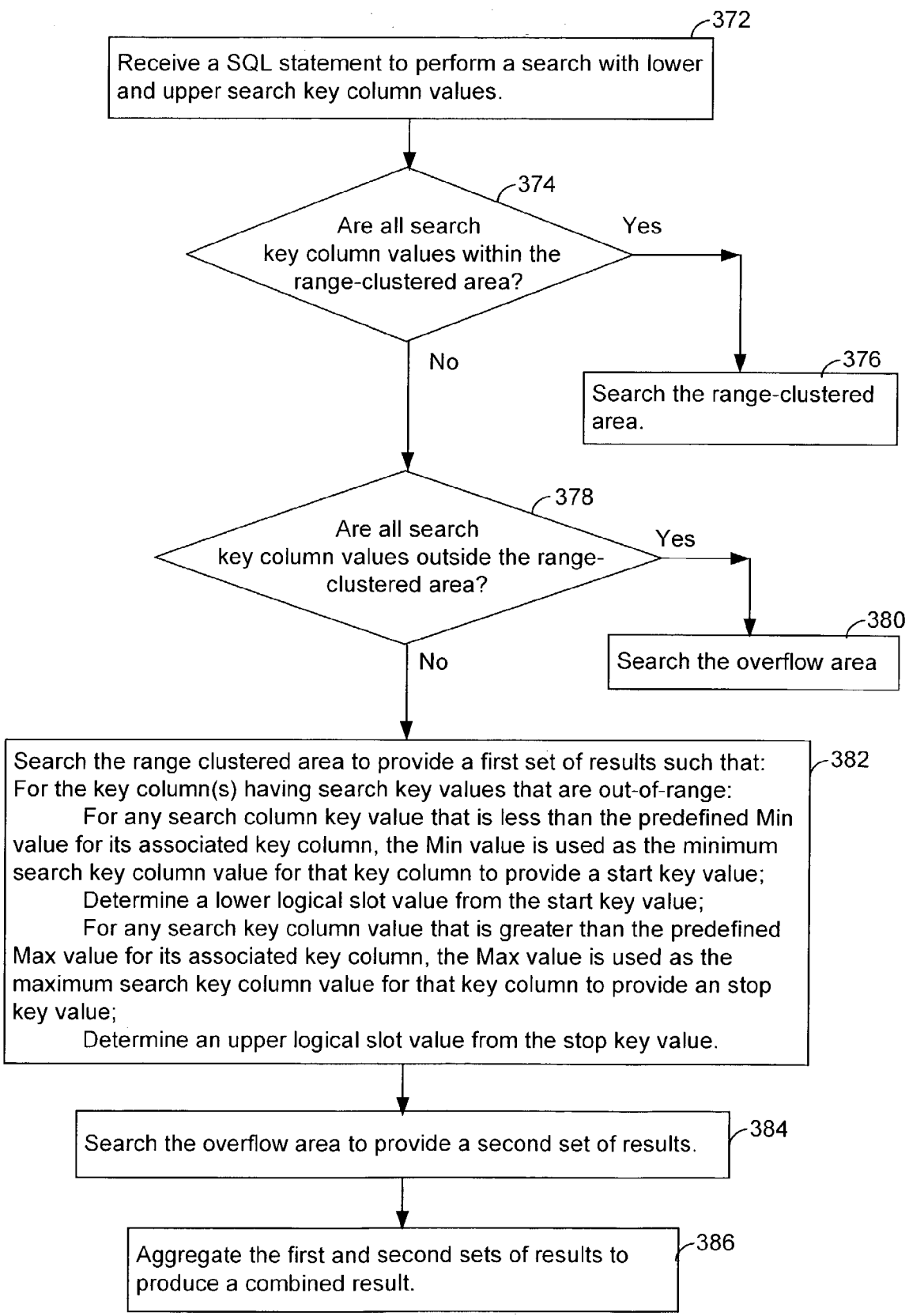
FIG. 23 depicts a high-level flowchart of a process to scan a range-clustered table with overflow area.

FIG. 23 depicts a high-level flowchart of an embodiment of a technique to scan, or search, a range-clustered table with an overflow area that is implemented by the search procedure 105 of FIG. 4. The scanning may be performed in response to a query, that is, a SQL SELECT statement. In step 372, a SQL statement to perform a search is received. The search request has one or more lower search key column values and one or more upper search key column values. Step 374 determines whether all the search key column values are within the key values of the range-clustered area. If so, step 376 searches the range-clustered area.

If not, step 378 determines whether all the search key column values are outside the key column values of the range-clustered area. If so, in step 380, the overflow area is searched.

If some of the search key column values are within the range key values of the range-clustered area and other search key column values are outside the range key values of the range-clustered area, both the range-clustered areas and overflow areas are searched. In step, 382 the range-clustered area is searched. The search parameters, upper and/or lower bounds, for the key columns having search key column values that are outside the range of key values of the range-clustered area are adjusted. For any search key column value that is less than the predefined minimum value for its associated key column, the minimum key value for the range-clustered area is used as the minimum search key column value, that is, the lower bound, to provide a start key value(s). For any search key column value that is greater than the predefined maximum value for its associated key column, the maximum key value for the range-clustered area is used as the maximum search key column value, that is, the upper bound, to provide a stop key value(s). Lower and upper logical slot numbers, which form the boundaries of the search, are derived from the start and stop key values, respectively. The range-clustered area is searched based on the lower and upper logical slot values to provide a first set of results.

In step 384, the overflow area is searched. During the search of the overflow area, each row is checked to determine whether its key values are within the lower and upper key values of the search. If so, that row is included in a second set of results.

In step 386, the first and second sets of results of the search of the range-clustered and overflow areas, respectively, are aggregated to produce a combined result which is returned to the user.

Figure 24:
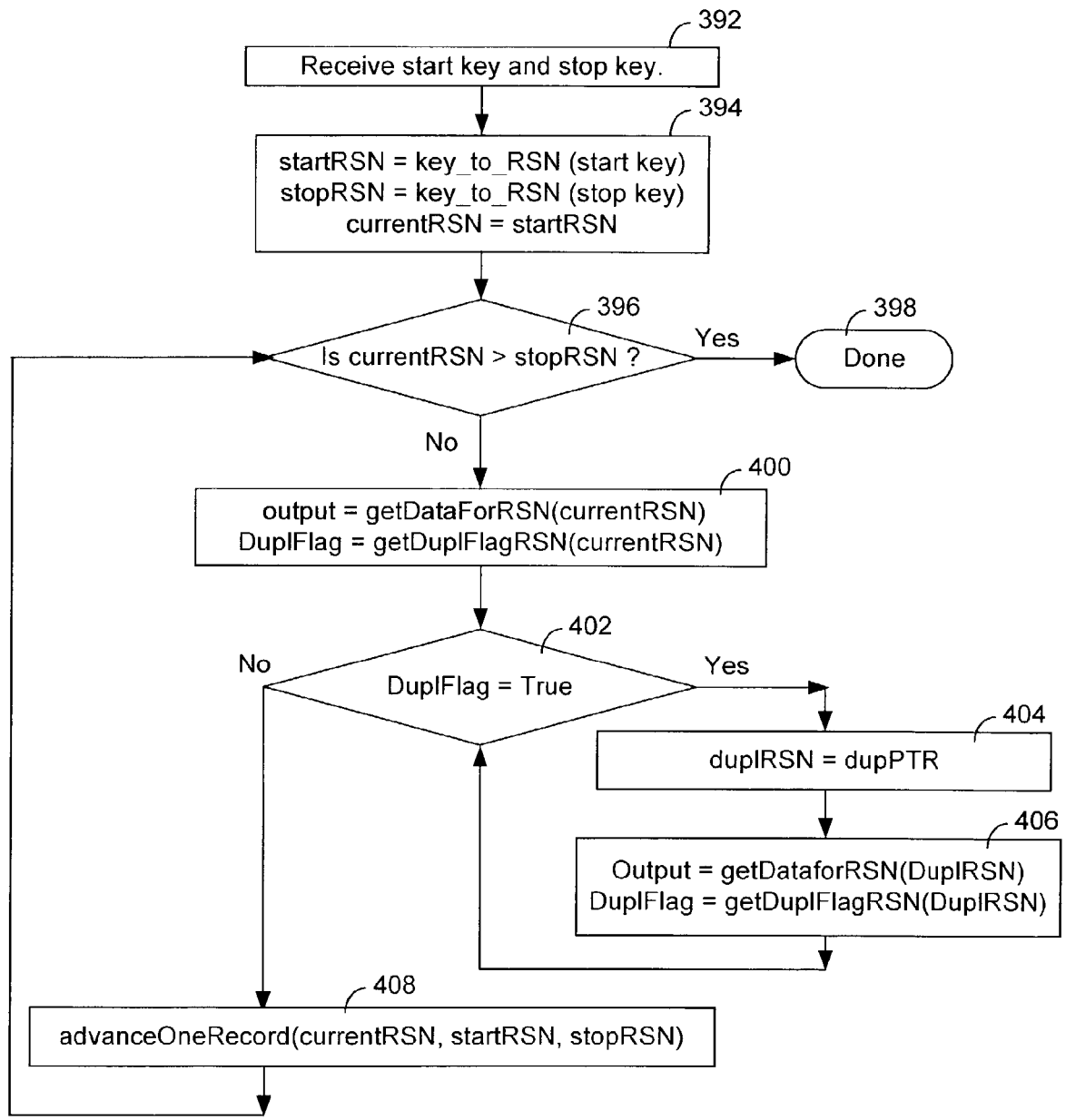
FIG. 24 depicts a flowchart of a process to scan a range-clustered table that also may include duplicates.

FIG. 24 depicts a detailed flowchart of an embodiment of a technique to scan a range-clustered table that may also include duplicates. In one embodiment, the technique of FIG. 24 is implemented by the Search RCT procedure 106 of FIG. 4, and may be used by steps 376 and 382 of FIG. 23. In other words, the Search Procedure 105 (FIG. 4) may invoke the Search RCT procedure 106 (FIG. 4) to search the range-clustered area of the table.

In step 392, a start key and a stop key are received. The start key and stop key are search parameters comprised of key column values. In step 394, start and stop logical slots, also referred to as start and stop row sequence numbers (RSNs) (startRSN and stopRSN), are determined for the start and stop keys, respectively. A value of the variable representing the current logical slot (currentRSN) is set equal to the value of the start RSN.

Step 396 determines whether the value of the current RSN is greater than the value of the stop RSN. If so, the scan is complete (step 398). If not, in step 400, the contents of the row associated with the current RSN is output, and the value of the duplicate flag (DuplFlag) of the row associated with the current RSN is retrieved.

Step 402 determines whether the value of the duplicate flag (DuplFlag) is "TRUE" which indicates that there are duplicate key values for the current row. If so, step 404 sets the value of a variable called duplRSN equal to the value of the duplicate row pointer (dupPTR). Step 406 outputs the value of the row associated with the duplicate RSN, and retrieves the value of the duplicate flag (DuplFlag) for the duplicate RSN, and proceeds to step 402 to determine whether there are additional rows with duplicate key values.

If step 402 determines that there are no further duplicate values for the current RSN, that is, the duplicate flag (DuplFlag) is "FALSE," step 408 advances the current RSN to point to the next logical slot, and the process continues at step 396. In one embodiment, the current RSN is incremented by one to point to the next logical slot.

Figure 25:
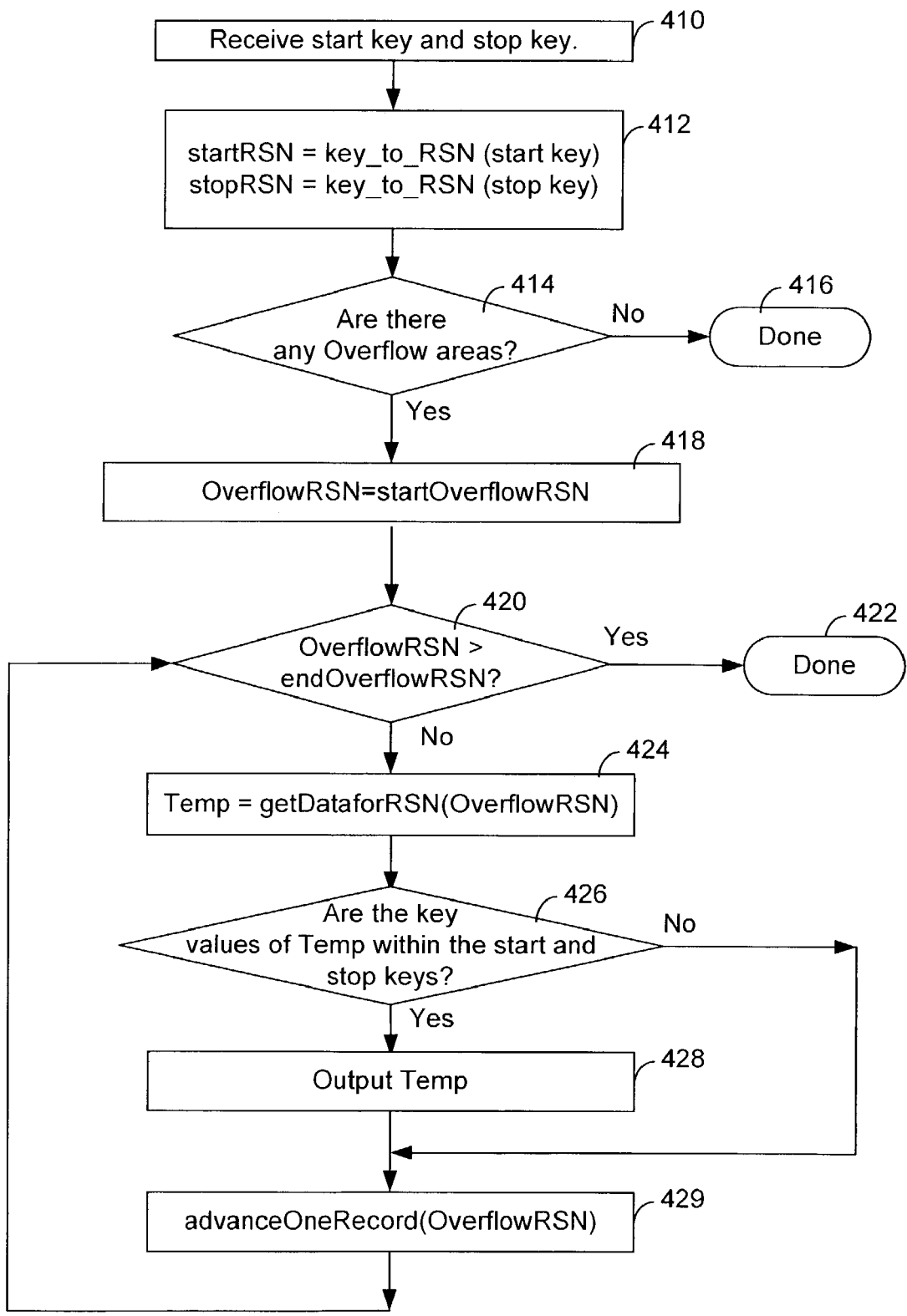
FIG. 25 depicts a flowchart of scanning the overflow area of a range-clustered table.

FIG. 25 depicts a flowchart of a technique to scan the overflow area of a range-clustered table. In one embodiment, the technique of FIG. 25 may be implemented by the Search Overflow procedure 108 of FIG. 4, and used by steps 380 and 384 of FIG. 23. In this embodiment, the overflow area has been provided as shown in FIG. 18, as a set of slots. In other words, the Search Procedure 105 (FIG. 4) may invoke the Search Overflow procedure 108 (FIG. 4) to search the overflow area of the table.

In step 410, a start key and a stop key are received. The start key and stop key are search parameters comprised of key column values. In step 412, the logical slots, startOverflowRSN and stopOverflowRSN row sequence numbers (RSNs) (startRSN and stopRSN) are determined for the stop and start keys, respectively.

Step 414 determines whether there are any overflow areas. If not, the process ends (step 416). If there are overflow areas, in step 418, a variable called OverflowRSN is set equal to startOverflowRSN. OverflowRSN is used as a slot counter to access slots in the overflow area, and is initialized to equal the value of a startOverflow RSN variable.

Step 420 determines whether the search of the overflow area is complete. If the value of OverflowRSN is greater than the value of endOverflowRSN, the process ends (step 422).

If the value of OverflowRSN is not greater than the value of endOverflowRSN, step 424 retrieves the row associated with the value of OverflowRSN and stores the row in a variable called Temp. Step 426 determines whether the key values of the row in Temp are within the values of the start and stop keys. If so, in step 428, the row in Temp, is output. In step 429, the value of the slot counter, OverflowRSN, is advanced, by a function called advanceOneRow( ), to point to the next slot. In one embodiment, the value of OverflowRSN is incremented by one, and the process continues to step 420.

If step 426 determines that the keys values of the row in Temp are not within the values of the start and stop keys, the process continues to step 429.

Locking in a Range-Clustered Table

FIG. 26 depicts a diagram of a sequence of slots 430 of a range-clustered table to illustrate locking in another alternate embodiment. The database engine uses locks to control concurrent access to the data in the table. An isolation level is specified for applications that access the table to define the type of locking. The isolation levels include the well-known repeatable-read (RR), read stability (RS), uncommitted read (UR) and cursor stability (CS).

The range-clustered table locks rows using discrete-locking, in contrast to conventional key locking and next-key locking. Discrete-locking means that all rows that are affected by an operation are locked. The number of rows locked depends on the isolation level. For the range-clustered table, discrete-locking implies that an RR scanner will lock every row between the start and stop key, whether that row is present or not, to protect the scanner from phantom inserts. For RS scanners, all rows that matched the set of predicates are locked. For CS scanners, the row which the cursor is currently pointing to and any rows which were altered during the scan are locked. For UR scanners, only the rows which will be altered are locked.

In the example of FIG. 26, a range scan and the locks obtained for RR, RS and CS isolation levels are shown. The start key 432 corresponds to logical slot 501 and the stop key 434 corresponds to logical slot 509. The current cursor position 436 (current row) is at logical slot 506. For an RR scanner, all slots from the start key (slot 501) to the current cursor position (slot 506) are locked including empty slots. For an RS scanner, the slots having rows are locked (502, 504–506), empty slots are not locked. For a CS scanner, the current slot (506) is locked. For a UR scanner, no locks are acquired. The locks are stored as locking information 124 of FIG. 4.

Locking on Overflows

In another embodiment, locking on overflows is implemented as described above, except that when new rows inserted into the overflow region, a table exclusive lock will wait for all executing RR scanners to exit and prevent new scanners from accessing the table. This also locks out RS scanners, therefore, in an alternate embodiment, a table lock which locks out only RR scanners may be used.

Extent Map Cache

FIG. 27 depicts a diagram of an extent map cache 126 which is used when accessing a range-clustered table in another embodiment of the present invention. An extent map provides a mapping from a logical page number to a physical page number that identifies where the page is stored on a disk. Typically, a persistent extent map is stored on the disk and provides a lookup table of logical-to-physical relative page numbers. The extent map cache is a partial copy of the persistent extent map. The extent map cache is stored in random access memory.

When a row of a table is accessed, the extent map cache is used to determine the location of the physical page storing that row on the disk. In particular, when accessing a particular row, the logical page number and physical slot number are determined as described above. The physical page number storing that slot is determined from the extent map cache based on the logical page number.

Without the extent map cache, determining the physical page number of a given logical page number requires a disk access to read the persistent extent map. Since a disk access is costly, the extent map cache reduces the number of disk accesses and improves performance.

Detecting the Presence of Overflows

Referring back to FIG. 18, the problem of detecting the presence of rows in the overflow area without reserving a separate bit that needs to be logged was solved by storing a variable called the-last-object-page-in-the-table 306 (FIG. 18), which is a logged value, and storing the page number of the last page of the range-clustered table (last-page-which-is-in-range) 308 (FIG. 1). If the value of the-last-object-page-in-the-table 306 is greater than the last-page-which-is-in-range 308, overflows exist in the table. In one embodiment, the pages numbers of the-last-object-page-in-the-table 306 and the last-page-which-is-in-range 308 are logical page numbers.

Latch Separation on Searched Updates and Deletes

Latching refers to reserving a page for a predetermined period of time to prevent others from using the page. Pinning refers to keeping a page in random access memory so that the page cannot be written to a disk.

Conventionally, a searched update or searched delete is performed in two phases. In a first phase, the rows are searched, and in a second phase the rows are updated or deleted. When using a B-tree, the search is performed on the tree and the delete is performed in the table. Two different pages are accessed, and each page is latched and pinned independently.

Using the range-clustered table, on searched updates and searched deletes, a target page is visited once to locate the row, and again to perform the update or the delete. The page is latched and pinned for the first visit, and remains pinned until the operation in the second visit completes.

Figure 28:
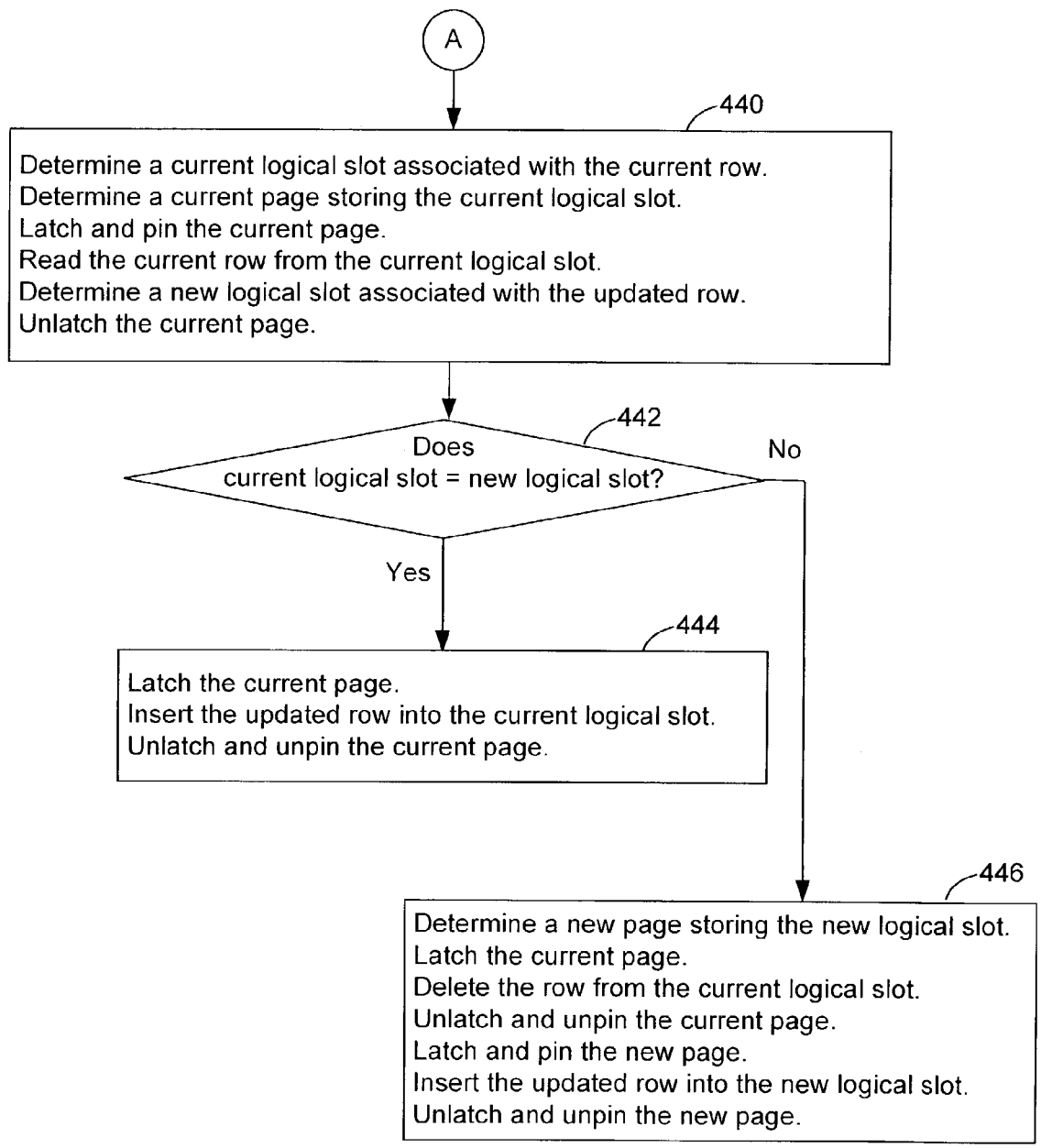
FIG. 28 depicts a high-level flowchart of an embodiment of a process of latching and pinning a slot of the range-clustered table when performing the updating of FIG. 15B.

FIG. 28 depicts a high-level flowchart of an embodiment of a process of latching and pinning pages of the range-clustered table when performing the updating of FIG. 15B that is implemented by the DMS 100 of FIG. 4. FIG. 28 is similar to FIG. 15B. In step 440, a current logical slot associated with the current row is determined. A current page storing the current logical slot is also determined., The current page is latched and pinned. The current row is read from the current logical slot. A new logical slot associated with the updated row is determined. The current page is unlatched.

Step 442 determines whether the current logical slot is equal to the new logical slot. If so, in step 444, the current page is latched. The updated row is inserted into the current logical slot. The current page is then unlatched and unpinned.

If step 442 determines that the current logical slot is not equal to the new logical slot, in step 446, a new page storing the new logical slot is determined. The current page is latched. The current row is deleted from the current logical slot, and the current page is unlatched and unpinned. The new page is latched and pinned, and the updated row is inserted into the new logical slot. The new page is unlatched and unpinned.

The present invention retains the benefits of conventional methods for unclustered or sparse data while improving the performance of the database management system when accessing and storing tightly clustered data. Because the technique preserves the B-tree indexing interface, much existing code can be reused, thereby reducing the implementation cost. Additionally, because the technique is compatible with the concept of a row identifier (RID), secondary indexes may be constructed as if the table was organized using conventional database management system methods.

The invention has been described by way of specific embodiments, but those skilled in the art will understand that various changes in form and detail may be made without deviating from the spirit or scope of the invention.

What is claimed is:

1. A computer-implemented method of operating a database, comprising:

receiving a command to create a table, the command specifying at least one key column, the command specifying an organization of the table based on at least one specified range associated with the at least one key column, respectively, the at least one specified range comprising at least one specified lower limit and at least one specified upper limit, respectively;

determining a number of logical slots based on the at least one specified lower limit and the at least one specified upper limit;

creating the table, the table comprising the at least one key column, the table comprising a range clustered area having a plurality of logical slots, the range clustered area having the number of logical slots, wherein successive said logical slots of the range clustered area are associated with successive logical slot numbers, wherein the logical slots are associated with physical slots of one or more pages, successive ones of the physical slots of said pages being associated with successive ones of the logical slots;

calculating a logical slot number representing a location of a particular row in the range clustered area based on a particular key value of the at least one key column of the particular row and the at least one specified range, such that said calculating provides a distinct logical slot number of the logical slot numbers for each distinct key value of the at least one specified range, such that the successive logical slot numbers are associated with the distinct key values in key value order, respectively;

calculating a page number based on the logical slot number;

calculating a physical slot number based on the logical slot numbers; and accessing the particular row based on the page number and the physical slot number.

2. The method of claim 1 further comprising:

receiving a starting search key value and a stopping search key value;

determining a stopping logical slot number based on the stopping search key value;

determining a starting logical slot number based on the starting search key value, wherein the particular key value is the starting search key value; and repeatedly accessing rows stored at the successive logical slot numbers beginning at the starting logical slot number until the stopping logical slot number is reached.

3. The method of claim 2 further comprising:

locking zero or more of the logical slots between the starting logical slot number and the stopping logical slot number in accordance with an isolation level.

4. The method of claim 1 wherein the table comprises an overflow area, and further comprising:

accessing the particular row from the overflow area in response to the particular key value of the at least one key column being outside the at least one specified range.

5. The method of claim 1 wherein the table has an overflow area, and further comprising:

accessing the particular row from the overflow area in response to the particular key value of the at least one key column being a duplicate of at least one value of the at least one key column stored in the range clustered area of the table.

6. The method of claim 1 further comprising:
prior to said accessing, storing at least one of the pages of the table in a memory;
after said accessing, second accessing the particular row to change a portion of the data stored in the particular row, wherein the at least one of the pages remains in the memory until said second accessing is complete.

7. The method of claim 1 wherein said pages comprise logical pages and physical pages, the logical slots being organized in logical pages, the logical pages being associated with physical pages, the logical pages being associated with a logical page number, the physical pages being associated with a physical page number; further comprising:
storing an extent map cache in memory, the extent map cache storing a mapping of logical to physical page numbers,
wherein said accessing comprises determining a logical page number of a logical page containing the logical slot storing the particular row, and determining a physical page number storing the particular row based on the logical page number and the extent map cache.

8. A computer system for operating a database, comprising:
a table comprising at least one key column, the at least one key column being associated with at least one specified range, respectively, the at least one specified range comprising at least one specified lower limit and at least one specified upper limit, respectively, the table comprising a range clustered area having a plurality of logical slots, successive said logical slots of the range clustered area being associated with successive logical slot numbers, the range clustered area having a number of said logical slots based on the at least one specified lower limit and the at least one specified upper limit, wherein the logical slots are associated with physical slots of one or more pages, successive ones of the physical slots of the pages being associated with successive ones of the logical slots; and
a database engine on a computer-readable medium, comprising one or more modules, said one or more modules:
calculate a logical slot number representing a location of a particular row in the range clustered area based on a particular key value of the at least one key column of the particular row and the at least one specified range, such that said calculating provides a distinct logical slot number of the logical slot numbers for each distinct key value of the at least one specified range, such that the successive logical slot numbers are associated with distinct key values in key value order, respectively;
calculate a page number based on the logical slot number; and
calculate a physical slot number based on the logical slot number; and
access the particular row based on the page number and the physical slot number.

9. The computer system of claim 8, wherein said one or more modules:
receive a starting search key value and a stopping search key value;
determine a stopping logical slot number based on the stopping search key value;
determine a starting logical slot number based on the starting search key value, wherein the particular key value is the starting search key value; and
repeatedly access rows stored at the successive logical slot numbers beginning at the starting logical slot number until the stopping logical slot number is reached.

10. The computer system of claim 9, wherein said one or more modules locks zero or more of the logical slots between the starting logical slot number and the stopping logical slot number in accordance with an isolation level.

11. The computer system of claim 8, wherein the table comprises an overflow area, and the one or more modules:
access the particular row from the overflow area in response to the particular key value of the at least one key column being outside the at least one specified range.

12. The computer system of claim 8, wherein the one or more modules:
prior to said access, store at least one of the pages of the table in a memory;
after said access, second access the particular row to change a portion of the data stored in the particular row, wherein the at least one of the pages remains in the memory until said second access is complete.

13. A computer program product comprising a computer usable medium having computer usable program code for operating a database management system, said computer program product including:
computer usable program code for receiving a command to create a table, the command specifying at least one key column, the command specifying an organization of the table based on at least one specified range associated with the at least one key column, respectively, the at least one specified range comprising at least one specified lower limit and at least one specified upper limit, respectively;
computer usable program code for determining a number of logical slots based on the at least one specified lower limit and the at least one specified upper limit;
computer usable program code for creating the table, the table comprising the at least one key column, the table comprising a range clustered area having a plurality of logical slots, the range clustered area having the number of logical slots, wherein successive said logical slots of the range clustered area are associated with successive logical slot numbers, wherein the logical slots are associated with physical slots of one or more pages, successive ones of the physical slots of the pages being associated with successive ones of the logical slots;
computer usable program code for calculating a logical slot number representing a location of a particular row in the range clustered area based on a particular key value of the at least one key column of the particular row and the at least one specified range, such that said calculating provides a distinct logical slot number of the logical slot numbers for each distinct key value of the at least one specified range, such that the successive logical slot numbers are associated with distinct key values in key value order, respectively;
computer usable program code for calculating a page number based on the logical slot number;
computer usable program code for calculating a physical slot number based on the logical slot number; and computer usable program code for accessing the particular row based on the page number and the physical slot number.

14. The computer program product of claim 13 further comprising:
   computer usable program code for receiving a starting search key value and a stopping search key value;
   computer usable program code for determining a stopping logical slot number based on the stopping search key value, and determining a starting logical slot number based on the starting search key value, wherein the particular key value is the starting search key value; and
   computer usable program code for accessing rows stored at the successive logical slot numbers beginning at the starting logical slot number until the stopping logical slot number is reached.

15. The computer program product of claim 14, further comprising:
   computer usable program code for locking zero or more of the logical slots between the starting logical slot number and the stopping logical slot number in accordance with an isolation level.

16. The computer program product of claim 13, wherein the table comprises an overflow area, further comprising:
   computer usable program code for accessing the particular row from the overflow area in response to the particular key value being outside the at least one specified range.

17. The computer program product of claim 16, further comprising:
   computer usable program code for prior to said accessing, storing at least one of the pages of the table in a memory;
   computer usable program code for, after said accessing, second accessing the particular row to change a portion of the data stored in the particular row, wherein the at least one of the pages remains in the memory until said second accessing is complete.

* * * * *